United States Patent [19]
Onodera et al.

[11] Patent Number: 5,574,878
[45] Date of Patent: Nov. 12, 1996

[54] METHOD OF PARALLEL PURGING OF TRANSLATION LOOKASIDE BUFFER IN A MULTILEVEL VIRTUAL MACHINE SYSTEM

[75] Inventors: Osamu Onodera, Hadano; Ken Uehara, Isehara; Yuji Kobayashi; Hideaki Amano, both of Hadano, all of Japan

[73] Assignee: Hitachi, Ltd., Tokyo, Japan

[21] Appl. No.: 306,983

[22] Filed: Sep. 16, 1994

[30] Foreign Application Priority Data

Sep. 17, 1993 [JP] Japan .................................. 5-231946

[51] Int. Cl.$^6$ .................................................. G06F 12/10
[52] U.S. Cl. .............................................. 395/417; 395/406
[58] Field of Search ........................... 395/415, 417, 395/460, 461, 462, 486, 406

[56] References Cited

U.S. PATENT DOCUMENTS 4,068,303   1/1978   Morita ................................ 395/417
4,733,348   3/1988   Hiraoka et al. ..................... 395/417

*Primary Examiner*—Jack A. Lane
*Assistant Examiner*—Kevin Verbrugge
*Attorney, Agent, or Firm*—Antonelli, Terry, Stout & Kraus

[57] ABSTRACT

A method fr purging a translation lookaside buffer purges only those entries required to be purged in order to eliminate overhead incurring degradation in the use efficiency of the translation lookaside buffer. The buffer is employed in a virtual machine system containing a plurality of levels of virtual machines and at least one register for storing virtual machine identification codes. Upon execution of an instruction, which is issued by a particular one of the virtual machines and which is accompanied by a purge of the translation lookaside buffer, the virtual machine identification code of the particular virtual machine and a virtual machine identification code of another virtual machine having a translation lookaside buffer entry to be purged are stored in the register. When the instruction is executed, the entry storing the virtual machine identification code which coincides with that of the particular virtual machine is purged, while the entry storing the virtual machine identification code which coincides with that of the other virtual machine is purged in parallel.

3 Claims, 18 Drawing Sheets

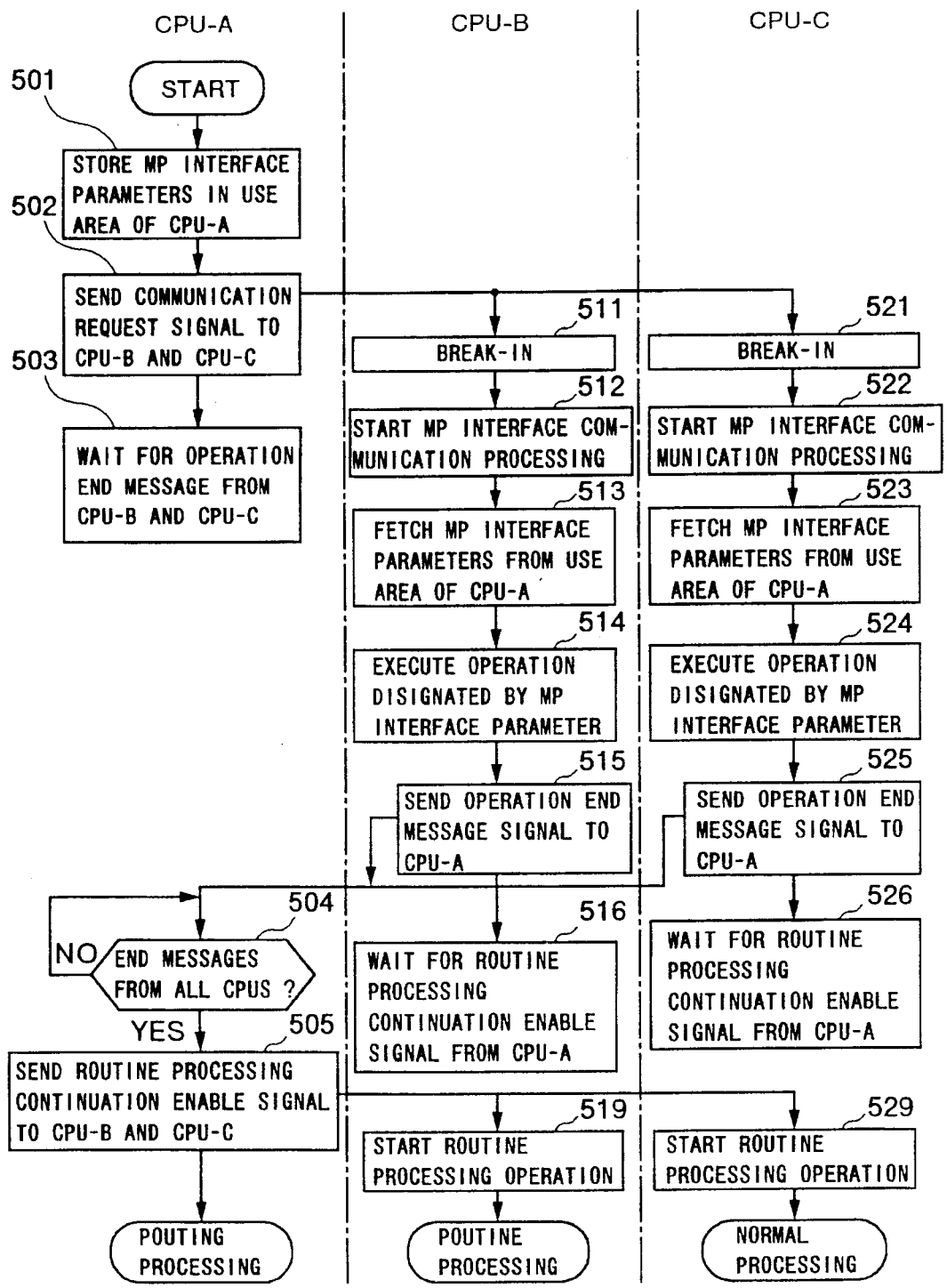

METHOD OF PARALLEL PURGING OF TRANSLATION LOOKASIDE BUFFER IN A MULTILEVEL VIRTUAL MACHINE SYSTEM

BACKGROUND OF THE INVENTION

The present invention relates to a method of purging an translation lookaside buffer in a virtual machine system implemented or structuralized on a single or plural central processing units.

In general, in an information processing system in which a virtual storage scheme is adopted, it is necessary to translate a virtual address required for the information processing system to make access to data and instruction stored in a main storage into an absolute address. For realizing such address translation, there is provided an address translation table.

Concerning the specifications and the means in general for translating of the virtual addresses into the absolute addresses, there is known a technique described, for example, in a literature entitled "Enterprise System Architecture/390 Principles of Operation" (SA22-7201-00) published by IBM Corporation.

In the recent years, an information processing system referred to as the virtual machine system has been developed, and the mode for using the virtual machine system tends to be more and more generalized.

With the phase "the virtual machine system", it is contemplated to mean an information processing system in which a virtual machine control program (also referred to as the VMCP in abbreviation) is executed by a central processing unit (hereinafter referred to as the real CPU in abbreviation or PIP (Physical instruction processor) in alias), wherein a single or plural operating systems (also referred to as OS in abbreviation) are caused to run under the control of the virtual machine control program (VMCP) to thereby generate a single or plural virtual machines internally of the real CPU. In this which the single operating system runs is referred to as the basic mode, while a mode in which a plurality of operating systems run independent of one another to thereby structuralize a plurality of virtual machines is referred to as the LPAR (Logical Partition) mode.

In the basic mode, one or more real CPUs, a single shared main storage (also referred to as the MS in abbreviation), and one or move channel paths (also referred to as the CHP in abbreviation) constitute resources. These hardware resources are handled as a single resource set or unit.

On the other hand, in the case of the aforementioned LPAR mode, the virtual machine control program is additionally imparted with a function for allowing the single hardware resource unit to be shared by the virtual machines so that a plurality of virtual machines can share the single hardware resource unit for common use with one another.

As the methods for allowing the single hardware resource unit to be shared among the individual virtual machines, there may be mentioned a method of allocating the hardware resource to the virtual machines in accordance with a time division scheme under the control of the virtual machine control program, a method of logically dividing the hardware resource unit so that the individual virtual machines are occupationally allocated with a hardware resource resulting from the logical division, and a hardware resource allocation method in which the two methods mentioned above are adopted in combination. By way of example, according to a technique disclosed in a literature entitled "Enterprise System/9000 Enterprise System/3090 Processor Resource/System Manager Planning Guide" (GA22-7123-08) published by IBM Corporation, a real CPU sharing method is proposed in which a real CPU is allocated to the individual virtual machines in accordance with a time division principle. Further, for allowing the virtual machines to share the input/output channel and the main storage, a method of logically dividing the input/output channel and the main storage for occupational allocation to the individual virtual machines is adopted.

By the way, in the implementation or structuralization of the virtual machine system known heretofore, the operating system (OS) destined to run on the real CPU (hereinafter this operating system will be referred to as the operating system of level "1") generates by itself an address translation table for allowing the operating systems of the virtual machines (these operating systems will be referred to as the operating system of level "2") to operate on a virtual address space of the operating system of level "1", wherein each of the operating systems of level "2" generates an address translation table to thereby create its own virtual address space.

Further, in the recent years, such a method finds general popularization as one of applications of the virtual machine system structuralization according to which a virtual machine control program is used as the operating system of level "1" running on the real CPU while the operating systems of level "2" running on the virtual address space of the operating system of level "1" are also realized as the virtual machine control programs, wherein further operating systems are used which run on the virtual address spaces of the operating systems of level "2". The last mentioned operating system will be referred to as the operating system of level On the other hand, as the method of sharing the real CPU between or among the virtual machines, the aforementioned method of allocating the real CPU to the individual virtual machines in accordance with a time division scheme is generally adopted. In the following, this method will be described in some detail by reference to FIG. 10 of the accompanying drawings.

Referring to FIG. 10, a real CPU is constituted by a single physical instruction processor (PIP) 102 and connected to a single main storage 101. On the PIP 102, there runs a virtual machine control program 111 which is capable of controlling virtual machines. Thus, a plurality of virtual machines are generated under the control of the virtual machine control program 111. As a plurality of virtual machines, there are generated logical CPUs (also referred to as the logical instruction processor or LIP in abbreviation which are designated by reference numerals 121, 122 and 123, respectively.

On these logical CPUs, i.e., the logical instruction processor-A 121, processor-B 122 and processor-X 123, independent operating systems or OSs can run, respectively.

Recently, in addition to the structuralization mode illustrated in FIG. 10, there has been developed a method of realizing such a virtual machine system in which under the control of a virtual machine control program (also referred to as the VMCP of level "1") running on the real CPU (PIP) 102, a plurality of virtual machines are generated in each of which a virtual machine control program (hereinafter referred to as the VMCP of level "2") are caused to run, wherein under the control of each of the virtual machine control programs of level "2", a plurality of virtual machines are generated for allowing guest operating systems to run on the generated virtual machines, respectively. This method also tends to be accepted generally.

FIG. 11 is a diagram showing a structure of a virtual machine system in which a pair of virtual machine control programs of level "1" and level "2", respectively, are loaded in a single real CPU (PIP), wherein virtual machines are generated under the control of these virtual machine control programs.

Referring to FIG. 11, the real CPU (PIP) is constituted by a single PIP (physical instruction processor) 202 which is connected to a main storage 201. On this real CPU (PIP) 202, there runs a virtual machine control program 211 of level "1" which is capable of controlling virtual machines. Thus, under the control of the virtual machine control program 211 of level "1", a plurality of virtual machines are generated. The logical CPUs of these virtual machines are referred to as the logical instruction processors or LIP each level "1".

On the logical instruction processor of level "1", there runs a virtual machine control program 231 of level "2" which is capable of controlling virtual machines. Thus, under the control of the virtual machine control program 231 of level "2", there are further generated a plurality of virtual machines whose LIPs (logical CPUs) will hereinafter be referred to as the logical CPUs or logical instruction processors of level "2".

The virtual machine control program 231 of level "2" generates a plurality of virtual machines exemplified by a logical CPU-A (LIP) 241 of level "2" and a logical CPU-B (LIP) 242 of level "2", wherein on these logical CPU-A 241 and CPU-B 242 each of level "2", there can run a guest operating system-A 251 and a guest operating system-B 252 independent of each other.

Next, a flow of controls for the virtual machine control program 211 of level 1 and the virtual machine control program 231 of level "2" as well as the guest operating systems-A and the guest operating systems-B denoted by 251 and 252 in operation of the virtual machine system of the structure implemented as illustrated in FIG. 11 will be explained by reference to a flow chart shown in FIG. 12.

Referring to FIG. 12, the virtual machine control program 211 of level "1" operates by setting initially the value of the virtual machine identification code (also referred to as the VMID) to "A". The abbreviated term "VMID" means an identification value which is allocated automatically and inherently to the virtual machine operating on the real CPU 202 by hardware and which is registered in a translation lookaside buffer (TLB in abbreviation) as a part of entries upon registration of logical addresses and absolute addresses each in a pair in the translation lookaside buffer.

When the virtual machine control program 211 of level "1" activates the virtual machine control program 231 of level "2", a start interpretive execution instruction (also referred to as SIE instruction) which is destined for activating or starting the virtual machine is made use of.

The start interpretive execution or SIE instruction is one of the interpretive execution functions, and the specification therefor in general are elucidated in detail, for example, in a literature entitled "IBM System/370 Extended Architecture Interpretive Execution" (SA22-7095) published by IBM Corporation.

The operand address of the start interpretive execution instruction designates an area or location where state of a register of the virtual machine to be activated is held. This will hereinafter be referred to as the state description or SD in abbreviation).

Upon activation of the virtual machine control program 231 of level "2" by the virtual machine control program 211 of level "1", the state description of level "1" (i.e., L1SD in abbreviation) which indicates an area holding the state of the register of the virtual machine control program 231 is set at an operand address of the start interpretive execution instruction (see step S130), whereon the start interpretive execution (SIE) instruction is issued (step S131).

The virtual machine control program 231 of level "2" is started or activated in this manner, whereby instruction processing for the virtual machine control program 231 of level "2" is executed in term of virtual machine. In that case, the virtual machine control program 231 of level "2" operates on the presumption that the value of virtual machine ID (identification code) is "B".

Subsequently, the virtual machine control program 231 of level "2" sets the state description (SD) of level "2" (i.e., L2SD) at the operand address of the start interpretive execution instruction (step S132) to thereby issue a start interpretive execution instruction (step S133), in order to start a guest operating system of level "3" (OS denoted by 251 or 252) which operates under the control of the virtual machine control program 231 of level "2".

At this juncture, the start interpretive execution (SIE) instruction issued by the virtual machine control program 231 of level "2" will hereinafter be referred to as the virtual start interpretive execution instruction.

When the virtual instruction is issued by the virtual machine control program 231 of level "2", the former is intercepted by the virtual machine control program 211 of level "1" (step S134), whereby the control is resumed by the virtual machine control program 211 of level "1".

The reason why the virtual machine control program 231 of level "2" is intercepted or suspended by the virtual machine control program 211 of level "1" can be explained by the fact that the virtual machine control program 231 of level "2" has no means for managing the real hardware resource.

When the control is transferred back to the virtual machine control program 211 of level "1", the virtual machine ID (identification code) is changed over to the value "A".

The virtual machine control program 211 of level "1" checks the cause which brought about the interception mentioned above. When the result of the check indicates that the interception of the virtual machine control program 211 of level "1" can be ascribed to the issuance of the virtual start interpretive execution instruction by the virtual machine control program 231 of level "2", the virtual machine control program 211 of level "1" simulates the virtual start interpretive execution instruction. In this simulation of the virtual start interpretive execution instruction, another state description (hereinafter referred to as the shadow SD) for starting the guest operating system of level "3" is set on the basis of both the virtual state description of level "2" (also referred to as the L2SD) prepared by the virtual machine control program 231 of level "2" and the allocation status of the real hardware resource in which the virtual machine control program 211 of level "1" has undergone the interception (step S135), whereon the start interpretive execution instruction is issued with the shadow state description being used as an operand (step S136).

When the start interpretive execution (SIE) instruction is issued with the shadow state description as the operand, the control is transferred to the guest operating system (251 or 252) of level "3", whereupon the value of virtual machine ID is changed over to "C".

The operation for issuing the start interpretive execution (SIE) instruction with the shadow state description as the operand is executed in such a manner that the virtual machine control program 231 of level "2" executes a virtual start interpretive execution instruction with the virtual state description as an operand. Subsequently, the guest operating system of level "3" operates.

Next, description will be directed to the control of the translation lookaside buffer (TLB) imparted with the virtual machine ID by reference to FIG. 13.

Referring to FIG. 13, the translation lookaside buffer (TLB) denoted by a reference numeral 410 is implemented as a hardware mechanism for translating the logical address into the absolute address at a high speed when the real CPU 202 makes access to data and instruction word and is comprised of an entry validity flag (also referred to as the V flag), an entry 412 for holding the virtual machine ID identifying the virtual machine to which the entry of concern belongs (also referred to as the VMID entry), an entry 413 for holding the origin and the address of a segment table (also referred to as the STD entry), an entry 414 for holding the logical address (also referred to as the logical address entry), an entry 415 for holding an absolute address corresponding to the logical address (also referred to as the absolute address entry), and an entry 416 for holding an main storage key imparted to the absolute address (also referred to as the main storage key entry).

The translation lookaside buffer (TLB) 410 contains a plurality of entry sets (0–n) each comprised of the entries mentioned above.

The segment table is omitted from illustration. It should however be mentioned that the segment table constitutes an address translation mechanism for translating the logical address into the absolute address in cooperation with the translation lookaside buffer 410.

A selector-A 420 responds to inputting of the logical address used by the real CPU 202 for making access to data and instruction word to thereby select one set of the associated entries mentioned above from plural sets of entries contained in the translation lookaside buffer 410.

An output register 430 serves to temporarily hold the contents of the set of the associated entries as selected from a plurality of entry sets contained in the translation lookaside buffer 410.

A virtual machine ID register 440 includes an entry 441 for holding the virtual machine ID (identification code) when the real CPU 202 makes access to data and instruction word (this entry will be referred to as the VMID entry) and an entry 442 for holding the state description absolute address which corresponds to the above-mentioned virtual machine ID (also referred to as the SD address entry). More specifically, these associated entries are set into one group, and the virtual machine ID register 440 contains a plurality of these groups.

The virtual machine ID register 440 serves to select the state description address entry 442 which corresponds to the address of the state description which constitutes the an operand of the start interpretive execution instruction upon operation of the virtual machine on the real CPU 202, whereon the content of the virtual machine ID entry 441 as contained in the selected entry is compared with the content of the virtual machine ID entry 412 of the translation lookaside buffer 410.

A comparator-A 450 serves to compare the content of the virtual machine ID entry 412 held temporarily in the output register 430 with that of the virtual machine ID entry 441 contained in the virtual machine ID register 440. A comparator-B 451 compares the content of the segment table designation entry 413 with the segment table origin used in accessing the main storage. Further, a comparator-C 452 compares the content of the logical address entry 414 with the logical address used for accessing the main storage.

The results of comparisons performed by the comparator-A 450, the comparator-B 451 and the comparator-C 452, respectively, are logically ANDed by an AND gate 460. A selector-B 470 serves to select for transfer the content of the main storage key entry 416 and the absolute address entry 415 held temporarily in the output register 430 in response to a hit signal indicating coincidence among the results of the above-mentioned comparisons and supplied from the AND gate 460.

As a control unit for controlling the translation lookaside buffer 410 and the peripheral circuits thereof on the whole, there is provided an address translation control unit 480.

Next, description will turn to the address translation operation carried out by the translation lookaside buffer 410 through cooperation with the peripheral circuits thereof which are arranged in the configuration described above.

When the real CPU 202 issues an access request to the main storage 201, the main storage access request and the corresponding logical address are sent out from the real CPU 202 to be inputted to the selector-A 420 and the comparator-C 452 via a signal line 4A0.

Upon reception of the logical address, the selector-A 420 selects one entry set from a plurality of entry sets contained in the translation lookaside buffer 410 on the basis of the value of the logical address as received and then issues a read request for that one entry set.

The translation lookaside buffer 410 responds to the reception of the entry read request by reading the one relevant entry place to thereby set the data as read out in the output register 430 via a signal line 4C0.

On the other hand, in the virtual machine ID register 440, the virtual machine ID entry 441 corresponding to the state description address entry 442 which holds the absolute address of the state description upon issuance of the access request to the main storage is selected, whereon the content of the virtual machine ID entry 441 as selected is inputted to the comparator-A 450 via a signal line 4D0.

After the data read-out from the translation lookaside buffer (TLB) 410 has been set in the output register 430, comparison is performed for deciding whether or not the TLB entry of concern is hit. This comparison is performed through a procedure described below.

At first, the content of the entry validity flag 411 placed in the output register 430 is supplied to the AND gate 460 via a signal line 4E0. Subsequently, the content of the virtual machine ID entry 412 placed in the output register 430 is inputted to the comparator-A 450 via a signal line 4El, while the content of the virtual machine ID entry 441 placed in the virtual machine ID register 440 is inputted to the comparator-A 450 via the signal line 4D0, whereby both the input data are compared by the comparator-A 450.

The signal indicating discrepancy or coincidence resulting from the comparison mentioned above is sent to the AND gate 460 via a signal line 4E4.

Furthermore, the content of the segment table designation (STD) entry 413 placed in the output register 430 is inputted to the comparator-B 451 via a signal line 4E2, while segment table designating data corresponding to the logical address used at the time point when the access request to the main storage 201 was issued by the real CPU 202 is inputted to the comparator-B 451 via a signal line 4A1, wherein both the input data mentioned above are compared with each other.

A signal indicating discrepancy or coincidence in the comparison mentioned above is sent to the AND gate 460 via a signal line 4E5.

Additionally, the content of the logical address entry 414 placed in the output register 430 is inputted to the comparator-C 452 via a signal line 4E3, while the logical address at the time point when the access request to the main storage 201 was issued by the real CPU 202 is inputted to the comparator-C 452 via a signal line 4A0, whereon both of these data are compared with each other.

A signal indicating discrepancy or coincidence in the comparison mentioned above is sent to the AND gate 460 via a signal line 4E6.

The AND gate 460 determines a logical product for the coincidence/discrepancy signals inputted via the signal lines 4E0, 4E4, 4E5 and 4E6, respectively, to thereby send out an translation lookaside buffer (TLB) hit signal of logic "1" onto a signal line 4G0 when all the input signals mentioned above are logic "1" (indicating the coincidence).

The TLB signal sent out onto the signal line 4G0 is inputted to the address translation control unit 480 and the selector-B 470.

In response to the reception of the TLB hit signal of logic "1" via the signal line 4G0, the selector-B 470 selects signal lines 4F0 and 4F1 for sending the contents of the absolute address entry 415 set at the output register 430 and the main storage key entry 416, respectively, whereby the absolute address corresponding to the logical address outputted from the translation lookaside buffer 410 and the main storage key imparted to the absolute address mentioned above are sent back to the request source real CPU 202.

Upon reception of the absolute address corresponding to the logical address and the main storage key imparted to that absolute address, the real CPU 202 issues an access request to the main storage 201 by using the absolute address and at the same time checks as to the key control protection by using a key contained in a program status word (also referred to as the PSW key in abbreviation).

On the other hand, upon reception of the TLB hit signal of logic "1" via the signal line 4G0, the address translation control unit 480 issues to the real CPU 202 a message to the effect that activation of a dynamic address translation process (hereinafter also referred to as the DAT in abbreviation) is unnecessary. By contrast, when the TLB hit signal is "0", a message indicating the need for activation of the dynamic address translation process is sent to the real CPU 202, which results in activation of the dynamic address translation pr DAT process.

Concerning the specification in general of the dynamic address translation process, reference should be made to, for example, the literatures mentioned hereinbefore. The absolute address obtained as the result of execution of the dynamic address translation process and other address information are registered in the translation lookaside buffer 410 via a signal line 4B0.

More specifically, the logical address accompanying the access request to the main storage 201, the segment table designating data and the virtual machine ID at that time point, the absolute address obtained as the result of the dynamic address translation process and the main storage key are registered in the entry validity flag 411, the virtual machine ID entry 412, the segment table designation entry 413, the logical address entry 414, the absolute address entry 415 and the main storage key entry 416 via the signal line 4B0 as the TLB entries determined on the basis of the logical address of the translation lookaside buffer 410. These TLB entries as registered in this way are used subsequently for making access to the main storage 201.

The entry registration for the translation lookaside buffer is effectuated primarily with the aid of hardware logic or a microprogram. On the other hand, registration of the content of the virtual machine ID entry 441 in the virtual machine ID register 440 and that of the state description address entry 442 are carried out primarily by a microprogram via signal lines 4H0 and 4H1, respectively.

Next, description will be directed to purge operation of the translation lookaside buffer 410.

Referring to FIG. 13, when an translation lookaside buffer purge request is issued from the real CPU 202, an ID number of the TLB entry to be purged is inputted via the signal line 4A0.

Upon reception of the TLB entry ID number via the signal line 4A0, the selector-A 420 selects one entry set corresponding to the TLB entry ID number from a plurality of entry sets placed in the translation lookaside buffer 410 to thereby issue a read request which corresponds to the selected entry.

The translation lookaside buffer 410 responds to the reception of the entry read request to thereby read out the relevant one entry set which is then loaded in the output register 430 via the signal line 4C0.

On the other hand, in the virtual machine ID register 440, the virtual machine ID entry 441 corresponding to the state description address entry 442 which holds the absolute address of the state description upon issuance of the TLB purge request is selected, and then the content of the virtual machine ID entry 441 is inputted to the comparator-A 450 via the signal line 4D0.

In response to the reception of the entry read request by the translation lookaside buffer 410, the content of one relevant entry set is read out and loaded in the output register 430. Thereafter, comparative decision is made as to whether or not that entry set needs to be purged.

This comparative decision is executed through a procedure described below. At first, the content of the virtual machine ID entry 412 placed in the output register 430 is inputted to the comparator-A 450 via the signal line 4E1, while the content of the virtual machine ID entry 441 in the virtual machine ID register 440 is inputted to the comparator-A 450 via the signal line 4D0, whereby comparison of both the input data is performed.

The signal resulting from the above comparison and indicating coincidence or discrepancy is sent to the translation lookaside buffer 410 via the signal line 4E4. When this signal is logic "1" (indicating coincidence), logic "0" data is written in the entry validity flag 411 contained in the TLB entry set selected from the translation lookaside buffer 410, whereby the TLB entry set is invalidated. By contrast, when the comparison result signal is logic "0" (indicating discrepancy), the TLB entry set of concern is not invalidated.

Subsequently, the operating system of level "1" running on the real CPU 202 creates an translation lookaside buffer by itself to allow the operating system of level "2" to run on the virtual address space for the operating system of level "1" as the virtual machine. Further, the operating system of level "2" also generates the translation lookaside buffer for creating a virtual address space. This processing will be descried below by reference to FIG. 14.

FIG. 14 shows an exemplary structuralization of a virtual machine system. In this conjunction, it is assumed that a virtual machine control program is used as an operating system of level "1" running on the real CPU, while another virtual machine control program is used as an operating system of level "2" running on the virtual address space of the operating system of level "1", and that an operating system of level "3" runs on the virtual address space on the operating system of level "2", wherein in the above arrangement, a main storage area is allocated to the operating system of level "1" with another main storage area being allocated to the operating system of level "2" and a further main storage area is allocated to the operating system of level "3".

In FIG, 14, the main storage area allocated to the virtual machine control program 211 of level "1" corresponds to an area A which is equal to the total area of the main storage 201. On the other hand, the main storage area allocated to the virtual machine control program 231 of level "2" corresponds to an area B shown in FIG. 14, which is a part of the area A. Further, the main storage area allocated to the operating system 251 of level "3" corresponds to an area designated by C, which is a part of the area B.

The virtual machine control program 211 of level "1" runs the assigned virtual machine ID assumes a value "A", while the virtual machine control program 231 of level "2" operates with the assigned virtual machine ID being a value of "B".

Further, the operating system 251 of level "3" operates when the assigned virtual machine ID assumes a value of "C".

More specifically, the virtual machine control program 211 of level "1" operates by using the area A when the virtual machine ID assigned thereto is "A". On the other hand, the virtual machine control program 231 of level "2" operates by using the area B which is a part of the area A, when the virtual machine ID assigned thereto is "B". Finally, the operating system 251 of level "3" operates by using the area C which is a part of the area B when the virtual machine ID assigned thereto takes on the value "C".

Next, referring to flow charts of FIGS. 15 and 16, description will be made of control flows of the virtual machine control programs of level "1", and level "2" and the operating system of level "3" in the virtual machine system structured as illustrated in FIG. 11 in the case where purging of the translation lookaside buffer becomes necessary.

It is first assumed that the allocation of the main storage 201 is such as illustrated in FIG. 14.

Referring to FIGS. 15 and 16, in a step 601, the virtual machine control program 211 of level "1" sets the state description (SD) which is an operand of the start interpretive execution (SIE) instruction as preparatory processing for activating or starting the virtual machine control program 231 of level "2" in order to allow a guest operating system of level "3" to run on the virtual machine realized by the virtual machine control program 211 of level "1". (The state description mentioned above will hereinafter be referred to as the state description of level "1" or L1SD in abbreviation.)

In a step 602, the virtual machine control program 211 of level "1" issues the start interpretive execution (SIE) instruction containing as a parameter the state description (SD) of level "1" or L1SD set in the step 601 to thereby activate or start the virtual machine control program 231 of level "2" on the VM of virtual machine control program 211 of level "1". From this time point, control is transferred from the virtual machine control program 211 of level "1" to the virtual machine control program 231 of level "1".

In a step 603, the virtual machine control program 231 of level "2" runs on the virtual machine realized by the virtual machine control program 211 of level "1". As the preparatory processing for allowing the operating system 251 of level "3" to run on the virtual machine realized by the virtual machine control program 231 of level "2", the virtual machine control program 231 of level "2" sets the state description (SD) which is an operand of the start interpretive (SIE) execution instruction. This state description (SD) will hereinafter be referred to as the state description of level "2" or L2SD in abbreviation.

In a step 604, the virtual machine control program 231 issues the start interpretive execution (SIE) instruction containing as an operand the L2SD (i.e., state description of level "2") in an attempt to start the operating system 251 of level "3" on the VM of virtual machine control program 231 of level "2".

In a step 605, with the start interpretive execution instruction issued by the virtual machine control program 231 of level "2" in the step 604, an instruction interception occurs because the start interpretive execution instruction has a cause or factor of instruction interception. Thus, the control is transferred back to the virtual machine control program 211 of level "1" from the virtual machine control program 231 of level "2".

In a step 606, the virtual machine control program 211 of level "1" analyzes the interception code to perform the interception processing on a code-by-code basis. In this case, the interception code indicates the interception of instruction.

More specifically, for the various interception codes, corresponding processings are performed, respectively, and when the interception code indicates the interception of an instruction, by way of example, then simulation of that instruction is performed.

Since in the exemplary case now under consideration, the instruction interception occurs when the start interpretive execution (SIE) instruction is to be executed, simulation of the start interpretive execution instruction is performed.

In a step 607, the virtual machine control program 211 of level "1" synthesizes the state description (SD) of level "1" (i.e., L1SD) prepared for starting the virtual machine control program 231 of level "2" and the state description (SD) of level "2" (i.e., L2SD) prepared for starting the operating system 251 of level "3" to thereby set a provisional state description (also referred to as the shadow SD) for allowing the operating system 251 of level "3" to run on the VM of virtual machine control program 211 of level "1".

In a step 608, the virtual machine control program 211 of level "1" issues a start interpretive execution instruction having the shadow state description set at the step 607 as an operand, and the operating system 251 of level "3" is activated or started to run on the VM of virtual machine control program 211 of level "1", which is equivalent to the starting of the operating system 251 of level "3" on the VM of virtual machine control program 231 of the "2". From this time point, the control is transferred to the operating system 251 of level "3" from the virtual machine control program 211 of level "1".

In a step 609, the operating system 251 of level "3" starts to run on the VM of virtual machine control program 231 of level "2".

In a step 610, when the main storage access is issued by the operating system 251 of level "3" in the course of operation on the VM of virtual machine control program 231 of level "2", an address translation exception (also referred to as the address translation exception of level "2") is selected.

When the address translation exception of level "2" is detected by the operating system 251 of level "3" running on the VM of virtual machine control program 231 of level "2" in the above-mentioned step 610, a program interruption is issued to the virtual machine control program 211 of level "1" in a step 611, whereby the control is transferred back to the virtual machine control program 211 of level "1" from the operating system 251 of level "3".

In a step 612, the virtual machine control program 211 of level "1" analyzes the host program interruption code to thereby perform the interruption processing on a code-by-code basis. In this case, the host program interruption code indicates the address translation exception of level "2".

Since the operating system 251 of level "3" detects the address translation exception of level "2", the address translation exception is messaged to the virtual machine control program 231 of level "2" as the result of the interruption processing mentioned above.

In a step 613, in order to inform the address translation exception to the virtual machine control program 231 of the level "2", the virtual machine control program 211 of level "1" synthesizes the state description of level "1" (i.e., L1SD) prepared for starting the virtual machine control program 231 of level "2" and the shadow state description prepared for starting the operating system 251 of level "3", to thereby set the state description of level "1" or L1SD for starting the virtual machine control program 231 of level "2".

In a step 614, the virtual machine control program 211 of level "1" issues a start interpretive execution (SIE) instruction with the state description of level "1" set in the step 613 being used as an operand, to thereby start to run the virtual machine control program 231 of level "2" on the VM of virtual machine control program 211 of level "1". At this time point, interruption parameters involved in the address translation exception are previously stored in a prefixed save area (hereinafter also referred to as the PSA in abbreviation) by the virtual machine control program 211 of level "1". Additionally, there is stored in the instruction address field of the L1SD the instruction address of the interrupting program status word contained in the prefixed save area of the virtual machine control program 231 of level "2".

Thus, the virtual machine control program 211 of level "1" simulates the address translation exception interruption to the virtual machine control program 231 of level "2". From this time point, the control is transferred to the virtual machine control program 231 of level "2" from the virtual machine control program 211 of level "1".

In a step 615, the virtual machine control program 231 of level "2" analyzes the interruption code furnished from the virtual machine control program 211 of level "1" for performing interruption processing on a code-by-code basis. In this case, the interruption code indicates the address translation exception interruption.

In a step 616, for various interruption codes, corresponding processings are performed on a code-by-code basis. By way of example, when an interruption code indicates the address translation exception interruption, maintenance processing is performed for the translation lookaside buffer. Since it is assumed in the exemplary case now under consideration that the address translation exception interruption takes place, processing for maintenance of the translation lookaside buffer is carried out.

In a step 617, the processing for maintenance of the translation lookaside buffer is executed by the virtual machine control program 231 of level "2". As a part of the translation lookaside buffer maintenance processing, a purge TLB instruction (i.e., instruction for purging the translation lookaside buffer) is issued. Concerning the specification of the purge TLB instruction, reference should be made to the literature mentioned hereinbefore.

When the virtual machine control program 231 of level "2" issues the purge TLB instruction in the step 617, an instruction interception takes place in a step 618 since the purge TLB instruction has a cause or factor of instruction interception. As a result of this, the control is transferred back to the virtual machine control program 211 of level "1" from the virtual machine control program 231 of level "2".

In a step 619, the virtual machine control program 211 of level "1" analyzes the interception code to thereby effect the interception processing on a code-by-code basis. In this exemplary case, the interception code indicates interception of the instruction.

Thus, in a step 620, the virtual machine control program 211 of level "1" simulates the purge TLB instruction, because the instruction interception takes place at the time point when the purge TLB instruction is to be performed by the virtual machine control program 231 of level "2".

In a step 621, the purge TLB instruction is issued as a part of the purge TLB simulation processing executed by the virtual machine control program 211 of level "1". As a result of execution of this purge TLB instruction, all the entries of the translation lookaside buffer which have the virtual machine ID values are purged.

In a step 622, the virtual machine control program 211 of level "1" sets the state description (SD) of level "1" (i.e., L1SD) which constitutes the operand of the start interpretive execution (SIE) instruction for starting the virtual machine control program 231 of level "2".

In a step 623, the virtual machine control program 211 of level "1" issues the start interpretive execution (SIE) instruction having as an operand the state description (SD) of level "1" (L1SD) set in the step 622 to thereby start the virtual machine control program 231 of level "2" on the virtual machine realized by the virtual machine control program 211 of level "1". From this time point, the control is transferred to the virtual machine control program 231 of level "2" from the virtual machine control program 211 of level "1".

In a step 624, the virtual machine control program 231 of level "2" is started to run on the VM of virtual machine control program 211 of level "1". Since the simulation processing for the address translation exception of level "2" as detected by the operating system 251 of level "3" has been completed, it becomes necessary for the virtual machine control program 231 of level "2" to start again the operating system 251 of level "3". Thus, as a preparatory processing for allowing the operating system 251 of level "3" to run on the VM of virtual machine control program 231 of level "2", the state description of level "2" (i.e., L2SD) is set as an operand of the start interpretive execution (SIE) instruction.

In a step 625, the virtual machine control program 231 of level "2" issues the start interpretive execution (SIE) instruction having as the operand the state description (SD) of level "2" set in the step 624 to thereby try to start the operating system 251 of level "3" on the virtual machine realized by the virtual machine control program 231 of level "2".

When the virtual machine control program 231 of level "2" issues the start interpretive execution instruction in the step 625, the control is transferred back to the virtual machine control program 211 of level "1" from the virtual machine control program 231 of level "2" in a step 626 because the start interpretive execution (SIE) instruction has a factor for the instruction interception.

In a step 627, the virtual machine control program 211 of level "1" analyzes the interception code and simulates the start interpretive execution (SIE) instruction because the instruction interception takes place when the start interpretive execution instruction is to be executed.

In a step 628, as a preparatory processing for allowing the operating system 251 of level "3" to run on the virtual machine realized by the virtual machine control program 211 of level "1", the virtual machine control program 211 of level "1" synthesizes the state description of level "1" (L1SD) prepared for starting the virtual machine control program 231 of level "2" as well as the state description of level "2" (L2SD) prepared for starting the operating system 251 of level "3", to thereby set the shadow state description for making the operating system 251 of level "3" to run on the VM realized by virtual machine control program 211 of level "1".

In a step 629, the virtual machine control program 211 of level "1" issues the start interpretive execution (SIE) instruction having as an operand the shadow state description set in the step 628 to thereby start the operating system 251 of level "3" on the VM of virtual machine control program 211 of level "1". This is equivalent to the starting or activation of the operating system 251 of level "3" on the virtual machine realized by the virtual machine control program 231 of level "2".

From this time point, the control is transferred to the operating system 251 of level "3" from the virtual machine control program 211 of level "1".

In a step 630, the operating system 251 of level "3" runs on the virtual machine control program 231 of level "2".

As can be understood from the foregoing description, the processing for the address translation exception of level "2" as detected by the operating system 251 of level "3" is carried out through cooperation of the virtual machine control program 211 of level "1" and the virtual machine control program 231 of level "2" in the steps 611 to 630.

Next, referring to flow charts shown in FIGS. 17 and 18, description will be made in detail of a method for purging an translation lookaside buffer (TLB) in a multiprocessor system in which a plurality of real CPUs are connected to a main storage on the assumption that the main storage 201 is allocated in such a manner as illustrated in FIG. 14 and that the translation lookaside buffer (TLB) and the peripheral circuits are arranged in such a configuration as shown in FIG. 13.

In this TLB purge processing, the steps 651 to 659 shown in FIG. 17 are substantially same as the steps 601 to 609 shown in FIG. 15. Accordingly, repeated description of these steps 651 to 659 will be unnecessary.

Now, referring to FIG. 17, in a step 660, an instruction "Set Storage Key Extended" (hereinafter referred to as the SSKE instruction) is issued by the operating system 251 of level "3" running on the VM of virtual machine control program 231 of level "2".

The SSKE instruction is an instruction for rewriting the main storage key of the main storage 201. For more particulars of this SSKE instruction, reference should be made to the literatures mentioned hereinbefore.

When the SSKE instruction is issued by the operating system 251 of level "3" in the above-mentioned step 660, an instruction interception is issued in a step 661 because the SSKE instruction has an instruction interception factor, whereby the control is transferred back to the virtual machine control program 211 of level "1" from the operating system 251 of level "3".

In a step 662, the virtual machine control program 211 of level "1" analyzes the interception code to thereby perform the interception processing on a code-by-code basis. In this case, the interception code indicates interception of the instruction.

Since the instruction interception is issued when the operating system 251 of level "3" running on the VM of virtual machine control program 231 of level "2" tries to execute the SSKE instruction, occurrence of this instruction interception is messaged to the virtual machine control program 231 of level "2".

In a step 663, in order to inform the instruction interception to the virtual machine control program 231 of the level "2", the virtual machine control program 211 of level "1" synthesizes or combines the state description of level "1" (i.e., L1SD) prepared for starting the virtual machine control program 231 of level "2" and the shadow state description prepared for starting the operating system 251 of level "3", to thereby set the state description of level "1" or L1SD for starting the virtual machine control program 231 of level "2".

In a step 664, the virtual machine control program 211 of level "1" issues a start interpretive execution (SIE) instruction having the state description (SD) of level "1" set in the step 663 as an operand, to thereby start the virtual machine control program 231 of level "2" on the VM of virtual machine control program 211 of level "1". At this time point, a parameter indicating occurrence of the instruction interception is stored in the state description of level "1" (L1SD). Additionally, there is stored in an instruction address field of the state description of level "1" an address of an instruction succeeding to the start interpretive execution (SIE) instruction issued by the virtual machine control program 231 of level "2". From this time point, control is transferred to the virtual machine control program 231 of level "2" from the virtual machine control program 211 of level "1".

In a step 665, the virtual machine control program 231 of level "2" analyzes the interception code furnished from the virtual machine control program 211 of level "1" for thereby performing interception processing on a code-by-code basis. In this case, the interception code indicates interception of the instruction.

In a step 666, since the instruction interception takes place upon execution of the SSKE instruction, simulation of the SSKE instruction is performed.

In a step 667, the processing for simulating the SSKE instruction is executed on the virtual machine control program 231 of level "2". As a part of the SSKE simulation processing performed by the operating system of level "3", a SSKE instruction for the operating system of level "2" is issued.

When the virtual machine control program 231 of level "2" issues the SSKE instruction in the step 667, an instruction interception takes place in a step 668 since the SSKE instruction has a cause or factor of instruction interception. As a result of this, the control is transferred back to the virtual machine control program 211 of level "1" from the virtual machine control program 231 of level "2" running on the VM of virtual machine control program 211 of level "1".

In a step 669, the virtual machine control program 211 of level "1" analyzes the interception code to thereby effect the interception processing on a code-by-code basis. In this exemplary case, the interception code indicates interception of the instruction.

Thus, in a step 670, the virtual machine control program 211 of level "1" simulates the SSKE instruction, because the instruction interception takes place at the time point when the SSKE instruction is to be performed by the virtual machine control program 231 of level "2" running on the VM of virtual machine control program 21 of level "1".

In a step 671, the processing for simulating the SSKE instruction is executed by the virtual machine control program 211 of level "1". At first, a lock command is issued by a CPU to all the other CPUs constituting the system for interrupting on suspending the processings being executed by these CPUs, whereby all the CPUs except for that having issued the lock command are locked. Subsequently, as a part of the processing for simulating the SSKE instruction as executed by the operating system of level "2", the SSKE instruction for the operating system of level "1" is issued.

When the SSKE instruction is executed, the TLB entries of all the CPUs having the virtual machine ID of the value "A" are partially purged.

In a step 672, an instruction for purging the translation lookaside buffer (referred to as the purge TLB instruction) is issued as a part of the SSKE instruction simulating processing being executed by the virtual machine control program 211 of level "1". As a result of execution of this purge TLB instruction, all the TLB entries having the values of the virtual machine ID are purged. Subsequently, as a part of the SSKE instruction simulating processing, a command for executing the purge TLB instruction is issued to all the CPUs except for the CPU which issued the lock command.

Upon completion of execution of the purge TLB instruction in all the CPUs, an unlock command for clearing the temporary processing suspension is issued to all the CPUs except for the CPU which issued the lock command, whereby the CPUs as unlocked can resume the processing interrupted of suspended temporarily.

In a step 673, the virtual machine control program 211 of level "1" sets the state description of level "1" which is an operand of the start interpretive execution (SIE) instruction for starting the virtual machine control program 231 of level "2".

In a step 674, the virtual machine control program 211 of level "1" issues a start interpretive execution (SIE) instruction having as an operand the state description of level "1" (L1SD) set in the step 673 to thereby start the virtual machine control program 231 of level "2" on the VM of virtual machine control program 211 of level "1". From this time point, control is transferred to the virtual machine control program 231 of level "2" from the virtual machine control program 211 of level "1".

Succeeding steps 675 to 681 are similar to the those 624 to 630 described hereinbefore. Accordingly, repeated description of the steps 675 to 681 will be unnecessary.

As is apparent from the foregoing, according to the prior art technique, the SSKE instruction issued by the operating system 251 of level 3 is realized through cooperation of the virtual machine control program 211 of level "1" and the virtual machine control program 231 of level "2" by executing the processing steps 661 to 681.

However, in the case of the prior art technique described above, the operating system 25 of level "3" operates with the virtual machine ID of value "C", while the operating system 231 of level "2" operates with the virtual machine ID of value "B". Accordingly, when the translation lookaside buffer is to be purged by the operating system 231 of level "2" as in the case of the address translation exception of level "2" as detected by the operating system 251 of level "3", it becomes necessary to purge all the TLB entries having the virtual machine IDs by intercepting the purge TLB instruction and issuing a purge TLB instruction through simulation by the virtual machine control program 211 of level "1" in order to simulate the purge TLB instruction issued by the operating system 231 of level "2".

To say in another way, when the translation lookaside buffer (TLB) is to be purged by the operating system 231 of level "2", it has heretofore been impossible to execute directly or straightforwardly the purge TLB instruction by the operating system 231 of level "2". Accordingly, simulation of the purge TLB instruction mentioned above by the operating system 211 of level "1" is required for issuing the purge TLB instruction for execution by the operating system 231 of level "2". The processing time involved in this operation provides as overhead a great obstacle to enhancement of performance of the virtual machine system.

Further, issuance of the purge TLB instruction by the operating system 211 of level "1" results in purging of all the TLB entries inclusive of those of level "1" which intrinsically need not be purged, which gives rise to remarkable degradation in the use efficiency of the translation lookaside buffer, presenting thus a problem which can never be neglected in order to ensure high performance of the virtual machine system.

Besides, in the virtual machine system of a multi-processor configuration, it has heretofore been impossible to assure satisfactory or perfect maintenance of the translation lookaside buffer solely with the execution of only the instruction which is required for purging the translation lookaside buffer such as the SSKE instruction issued by the operating system 251 of level "3".

In other words, because the operating system 251 of level "3" operates with the virtual machine ID of "C", it is impossible to purge the TLB entry having the absolute address designated by the operand address of the SSKE instruction issued by the operating system 251 of level "3" as a part of execution of the SSKE instruction issued by the virtual machine control program 211 of level "1" upon execution of the SSKE instruction issued by the virtual machine control program 211 of level "1" for simulating the SSKE instruction issued by the operating system 251 of level "3", the reason for which can be explained by the fact that the virtual machine control program 211 of level "1" operates with the virtual machine ID of value "A".

Under the circumstances, the lock command is issued by the virtual machine control program 211 to all the CPUs for stopping or suspending temporarily the processings being executed by the CPUs to thereby lock all the CPUs except for the CPU which issued the lock command. Subsequently, after the instruction which requires purging of the translation lookaside buffer such as the SSKE instruction is executed, the purge TLB instruction has to be issued for purging all the TLB entries.

Besides, a command for executing the purge TLB instruction is issued to all the CPUs except for the CPU which issued the lock command, wherein upon completion of execution of the purge TLB instruction by the CPUs, the unlock command has to be issued to all the CPUs except for that issued the lock command. The time taken for this operation represents, of course, overhead providing a great obstacle for enhancement of performance of the virtual machine system. Besides, issuance of the purge TLB instruction upon execution of the SSKE results in purging of all the TLB entries inclusive of the entry which is intrinsically not to be purged, which leads to remarkable degradation in the use efficiency of the translation lookaside buffer and thus presents a problem which can never be neglected when high performance is to be ensured for the virtual machine system.

SUMMARY OF THE INVENTION

In the light of the state of the art described above, it is an objective of the present invention to provide a method of purging a translation lookaside buffer incorporated in a virtual machine system, which method is capable of purging at a high speed only those of the TLB entries which have to be purged, to thereby solve the problems which the prior art techniques have suffered, as mentioned above.

In view of the above and other objects which will become apparent as description proceeds, the present invention is directed to a virtual machine system which includes at least one central processing unit equipped with a plurality of virtual machines, a main storage shared by the plurality of virtual machines, and a translation lookaside buffer having a plurality of entries for storing a plurality of sets, each including a logical address used by each of the virtual machines in accessing the main storage in the past, an absolute address corresponding to the logical address, and a virtual machine identification code, allocated to the access source virtual machine, for translating the logical address to the absolute address by referencing the entries when each of the virtual machines makes access to the main storage.

In the virtual machine system described above, there is provided according to a first aspect of the invention a method of purging the translation lookaside buffer in which at least one register is provided, in association with the virtual machine system mentioned above, for storing the virtual machine identification codes, and in which, upon execution of an instruction issued by a particular one of the virtual machines mentioned above and accompanied with need for purging the translation lookaside buffer, the virtual machine identification code of the above-mentioned particular virtual machine destined to execute the instruction and a virtual machine identification code of other virtual machine having an TLB entry to be purged are stored in the above-mentioned register, and when the instruction is executed, the entry storing the virtual machine identification code which coincides with that of the above-mentioned particular virtual machine is purged while the entry storing the virtual machine identification code which coincides with that of the other virtual machine is purged in parallel.

By virtue of the arrangement described above, when the purge TLB instruction is issued by the operating system of level "2", the purge TLB instruction is executed directly or straightforwardly by the operating system of level "2", whereby the TLB purge operation to be performed by the operating system of level "1" can be spared, which in turn means that overhead leading to degradation or lowering of the use efficiency of the translation lookaside buffer otherwise brought about by the TLB purge performed by the operating system of level "1" can be eliminated.

Further, the invention is directed to a virtual machine system which includes at least two central processing units each provided with a plurality of virtual machines, a main storage shared by the plurality of virtual machines, and an translation lookaside buffer having a plurality of entries for storing a plurality of sets each including a logical address used by each of the virtual machines in accessing the main storage in the past, an absolute address corresponding to the logical address and a virtual machine identification code allocated to the access source virtual machine and for translating the logical address to the absolute address by referencing the entries when each of the virtual machines makes access to the main storage.

In the virtual machine of the multi-processor configuration described above, there is provided according to a second aspect of the present invention a method of purging the translation lookaside buffer according to which a first communication means for allowing information to be transferred directly between or among the central processing units and a second communication means for allowing information to be transferred between the central processing units by way of an area of the main storage allocated to the use by hardware are provided in association with the virtual machine system mentioned above and in which upon execution of an instruction which is issued by a particular one of the virtual machines and which is accompanied with need for purging the translation lookaside buffer, the central processing unit having the particular virtual machine sends a virtual machine identification code of the virtual machine of the other central processing unit having the translation lookaside buffer entry to be purged to the other central processing unit by way of the first and second communication means. When the instruction is executed, the entry storing the virtual machine identification code coinciding with that of the particular virtual machine is purged and in parallel therewith, the entry storing the virtual machine identification code coinciding with that of the virtual machine incorporated in the other central processing unit is purged.

With the arrangement described above, the instruction issued by the operating system of level "3" and requiring the purge of the TLB entry can be executed independently, whereby lock operation as well as unlock operation for all the control processing units or CPUs incorporated in the multi-processor system can be rendered unnecessary.

Furthermore, because the multi-processor (MP) interface capable of realizing communications each in a pair among the real CPUs can be utilized for the TLB partial purge request as well as the TLB partial purge for message to all the real CPUs in the multi-processor configuration, overhead otherwise imposed on the virtual machine control program can be eliminated. Thus, not only the performance of the virtual machine system can be enhanced but also purging only of the entry as required can be accomplished.

The foregoing and other objects, advantages, manner of operation and novel features of the present invention will be understood from the following detailed description when read in connection with the accompanying drawings.

BRIEF DESCRIPTION OF THE DRAWINGS

FIG. 5 is a flow chart for illustrating information transactions or transfers between or among central processing units or CPUs in the system shown in FIG. 4;

19

Figure 4:
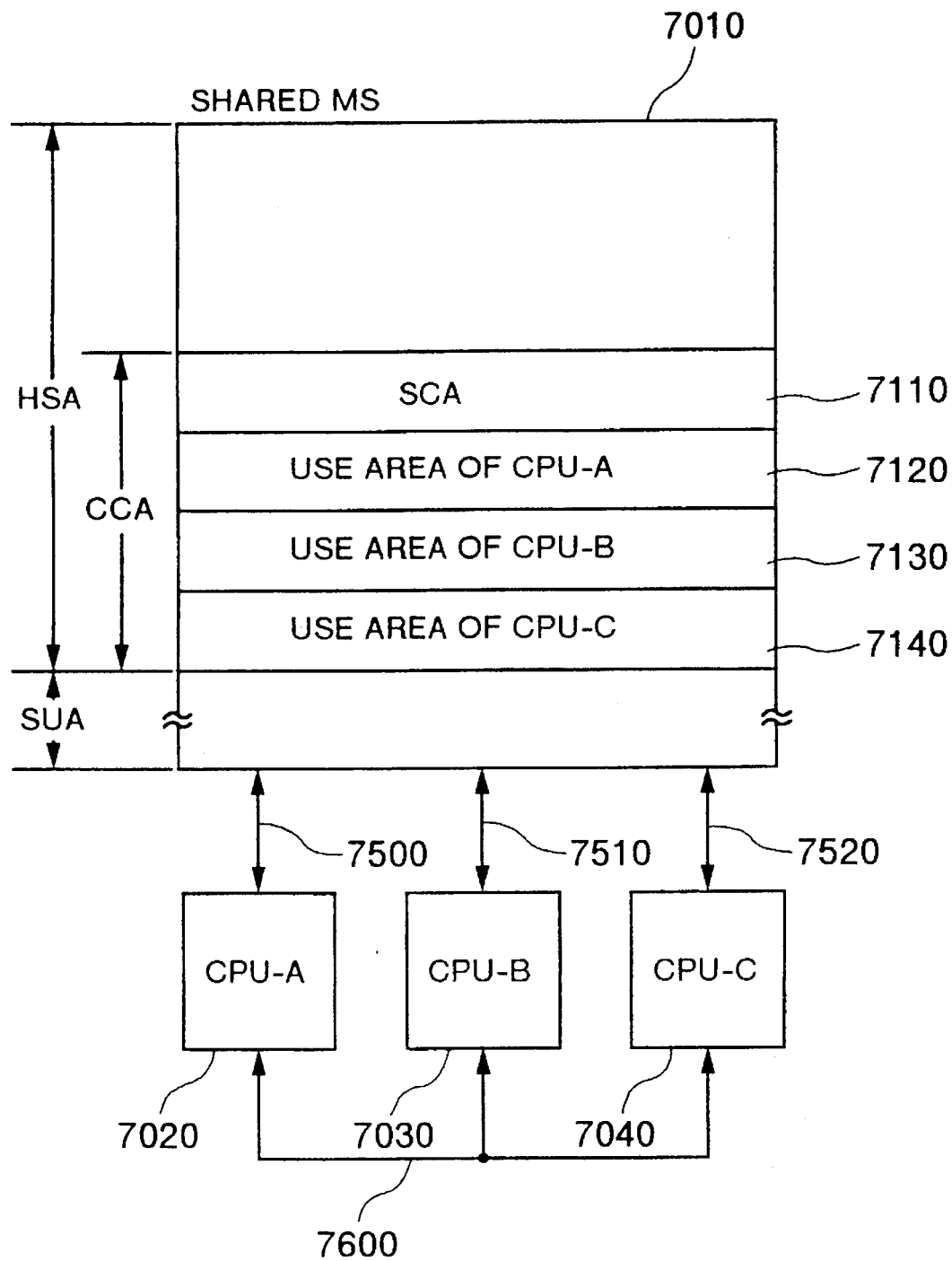
FIG. 4 is a schematic diagram showing a structure of a virtual machine system implemented in a multi-processor configuration to which the teachings of the present invention can be applied.
Figure 6A:
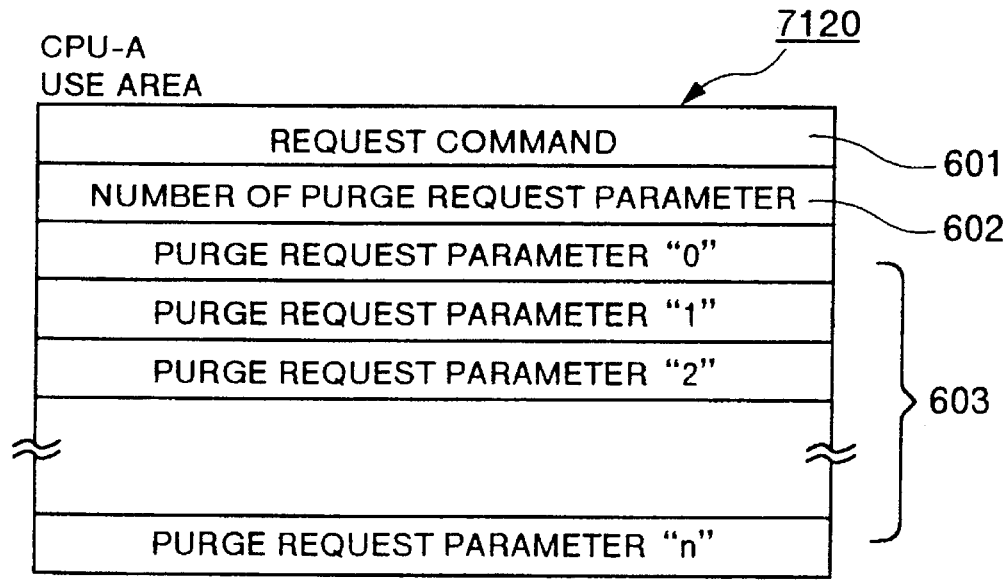
Figure 6B:
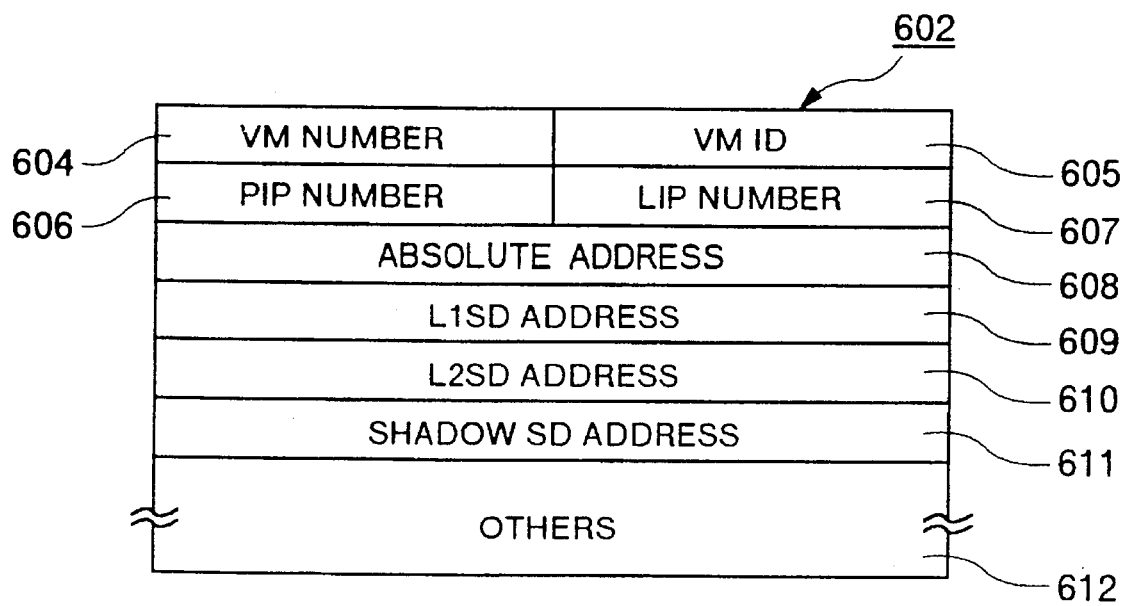
Figure 7:
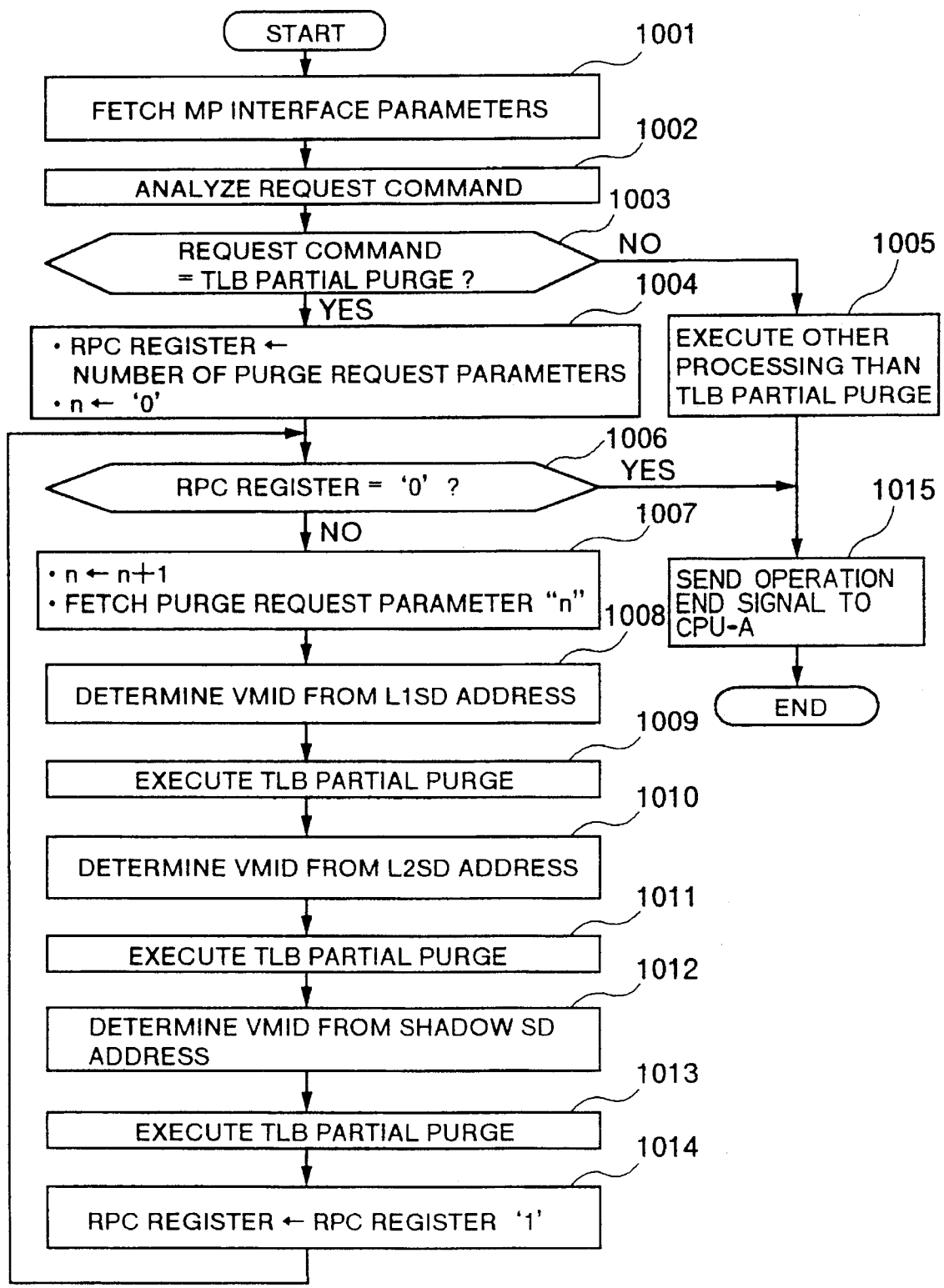
Figure 8:
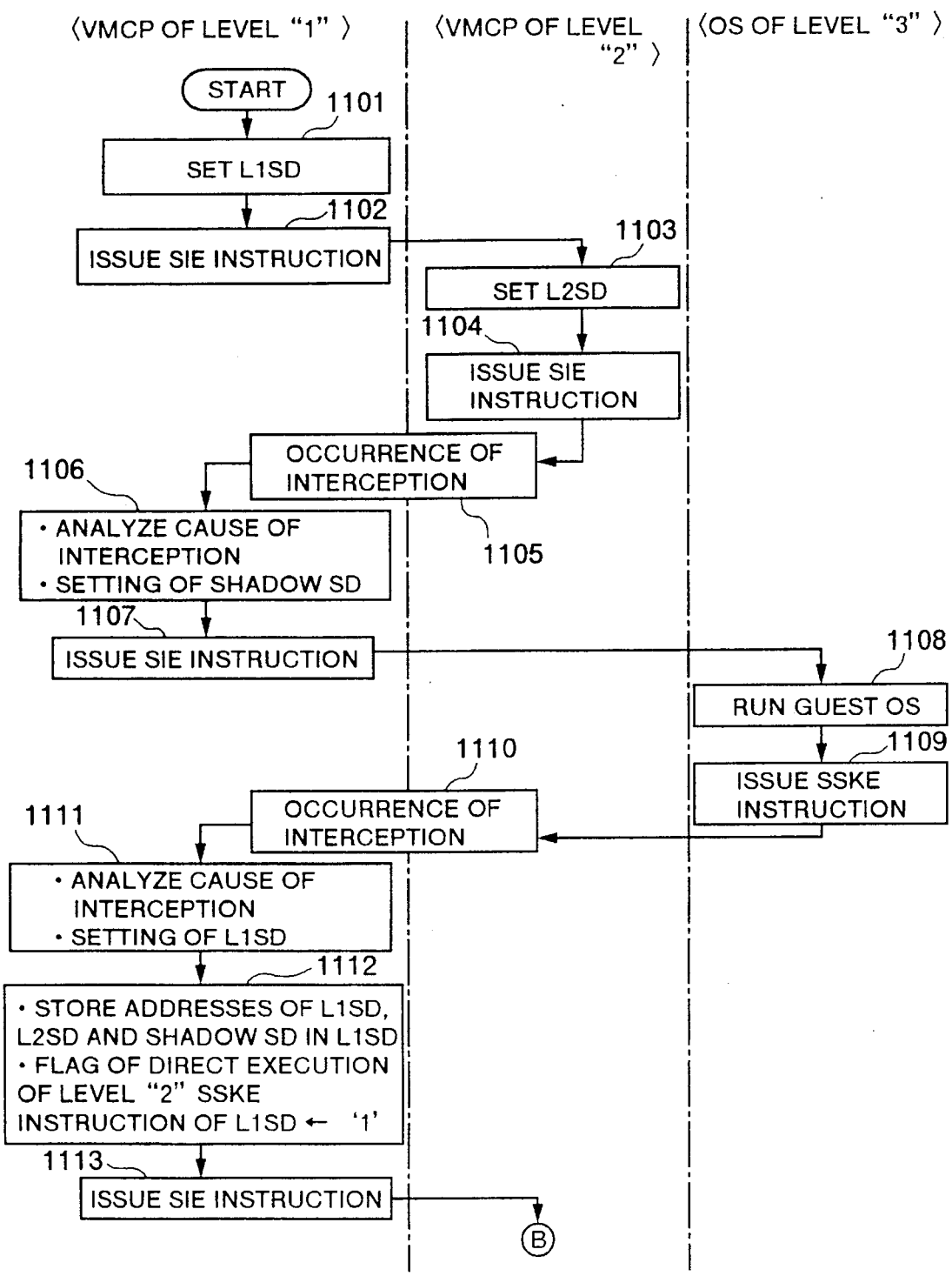
Figure 9:
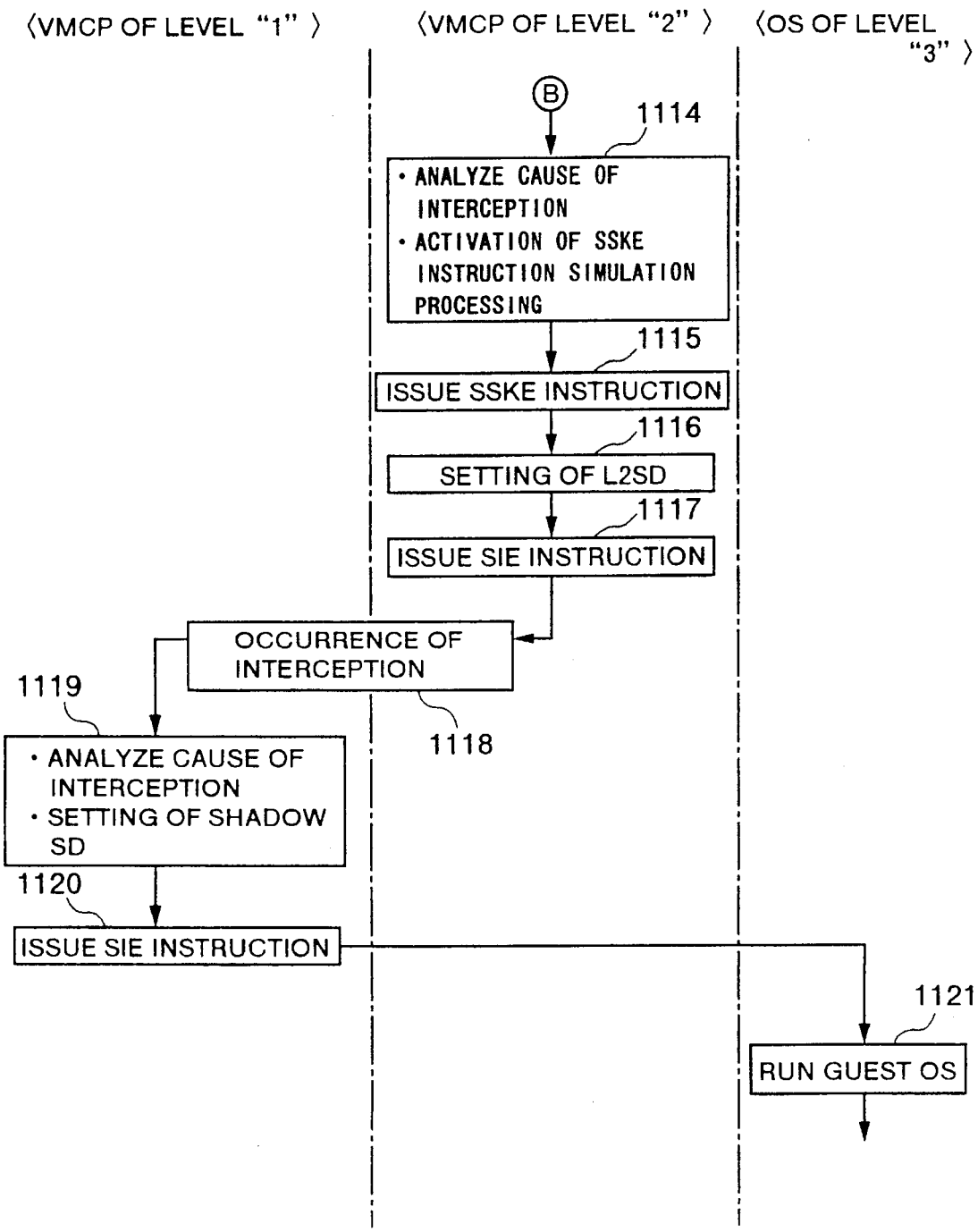
Figure 10:
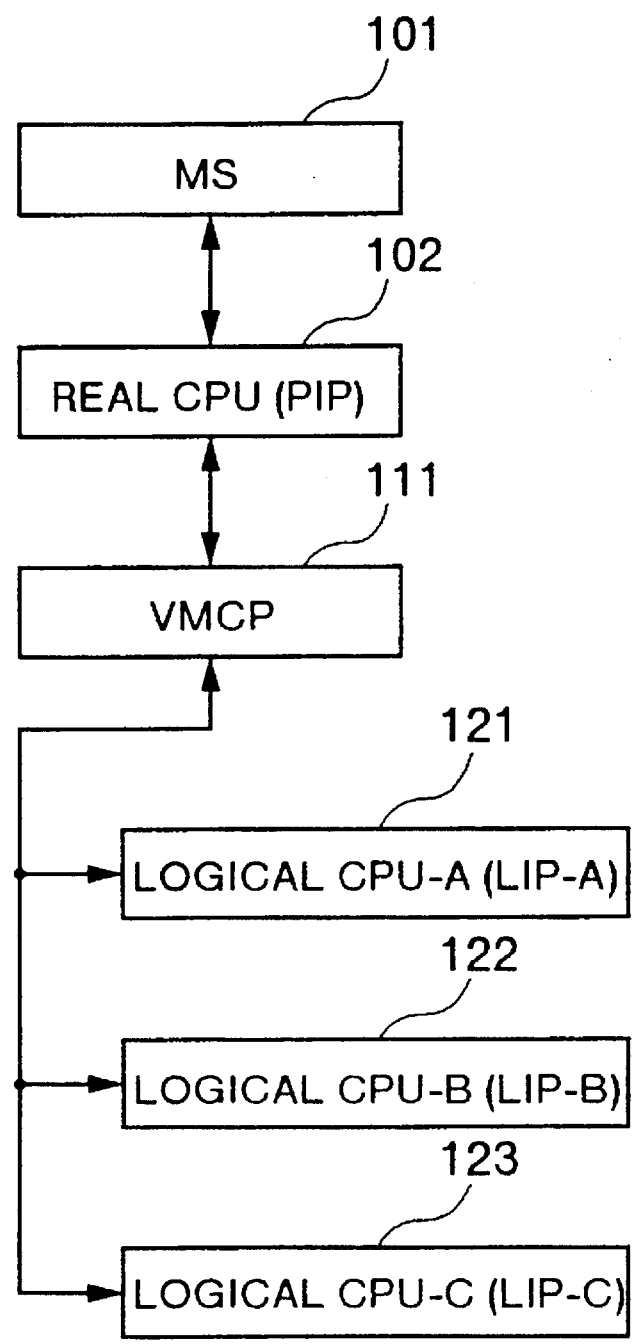
Figure 11:
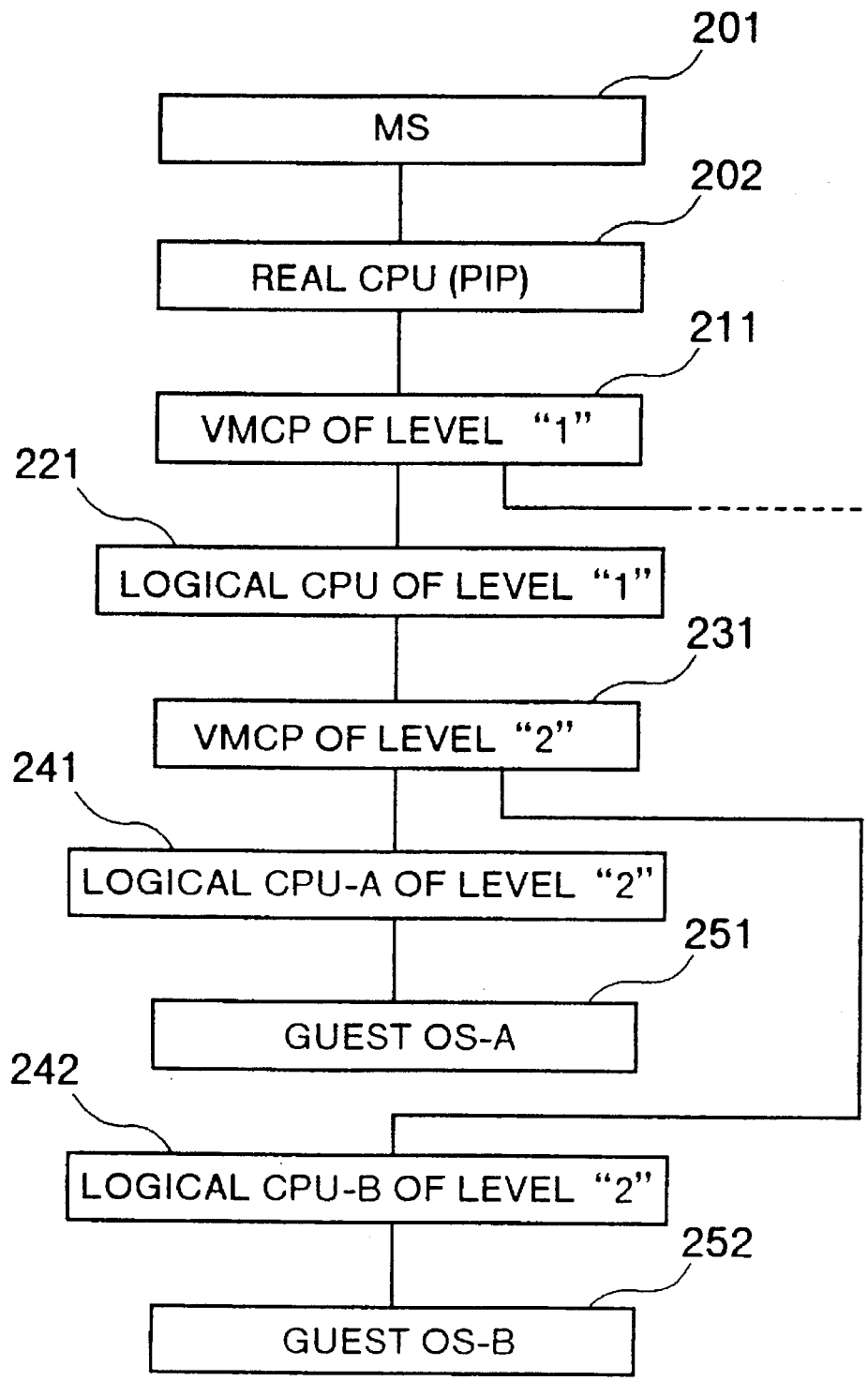
Figure 12:
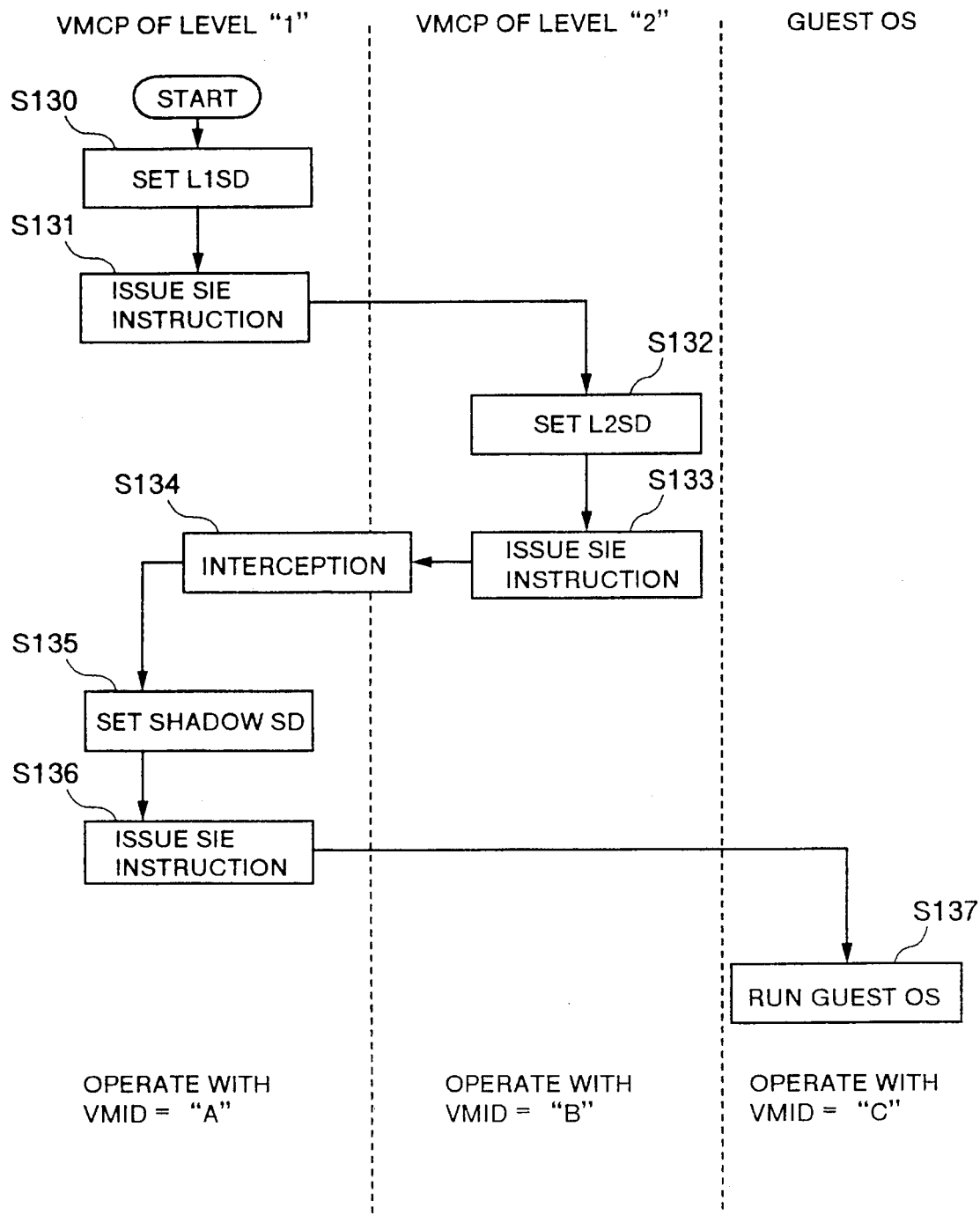
Figure 13:
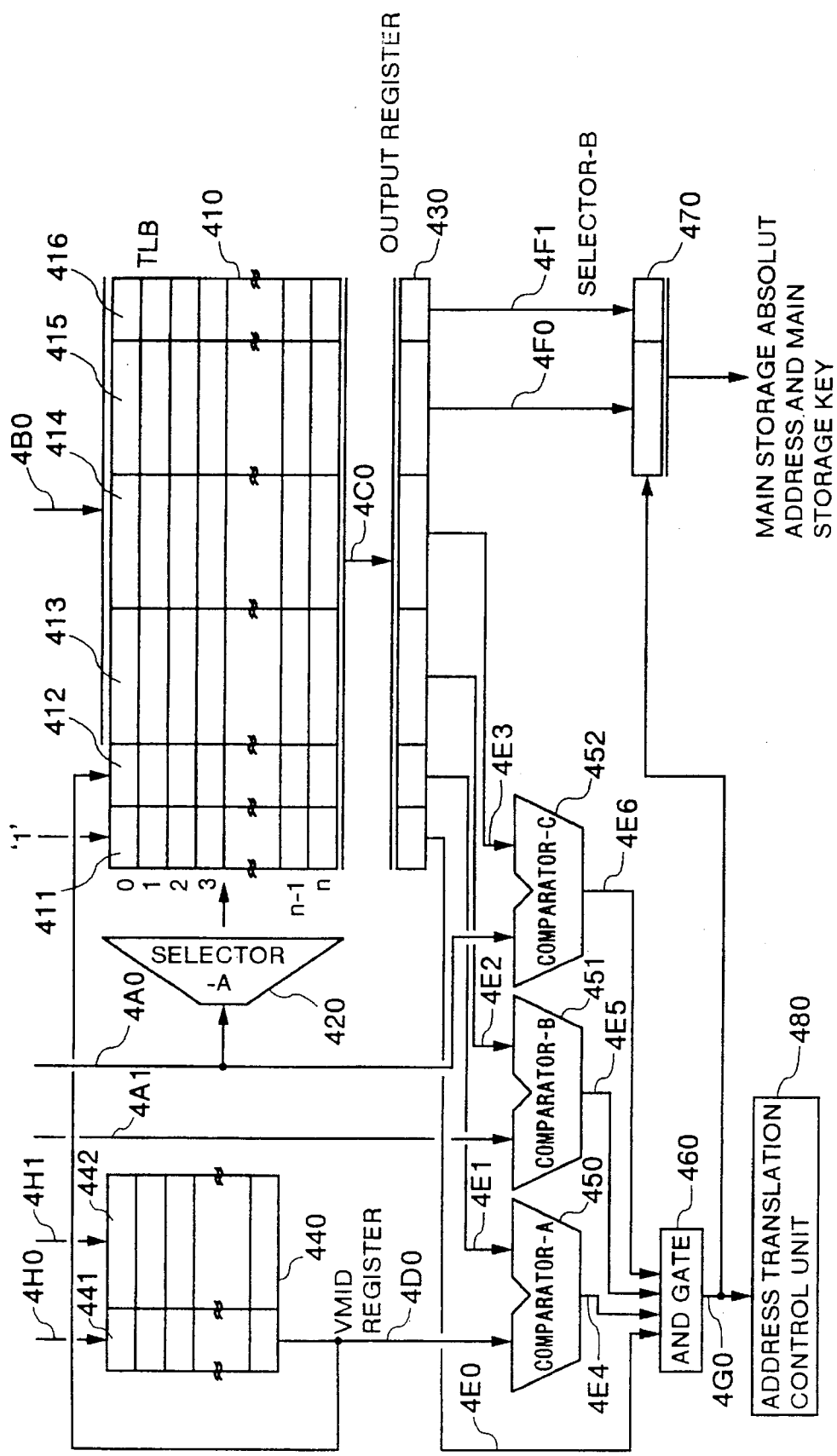
Figure 14:
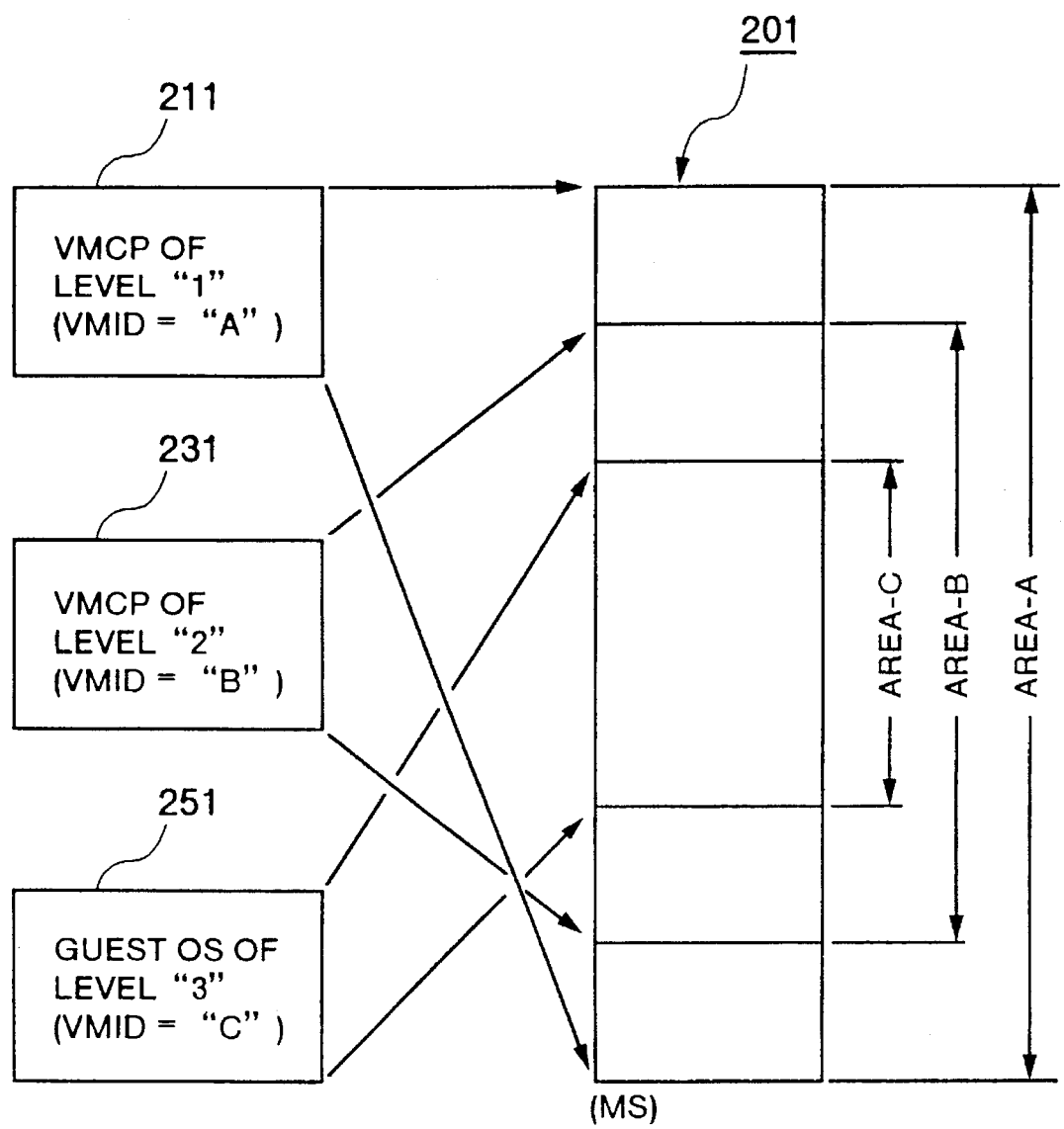
Figure 15:
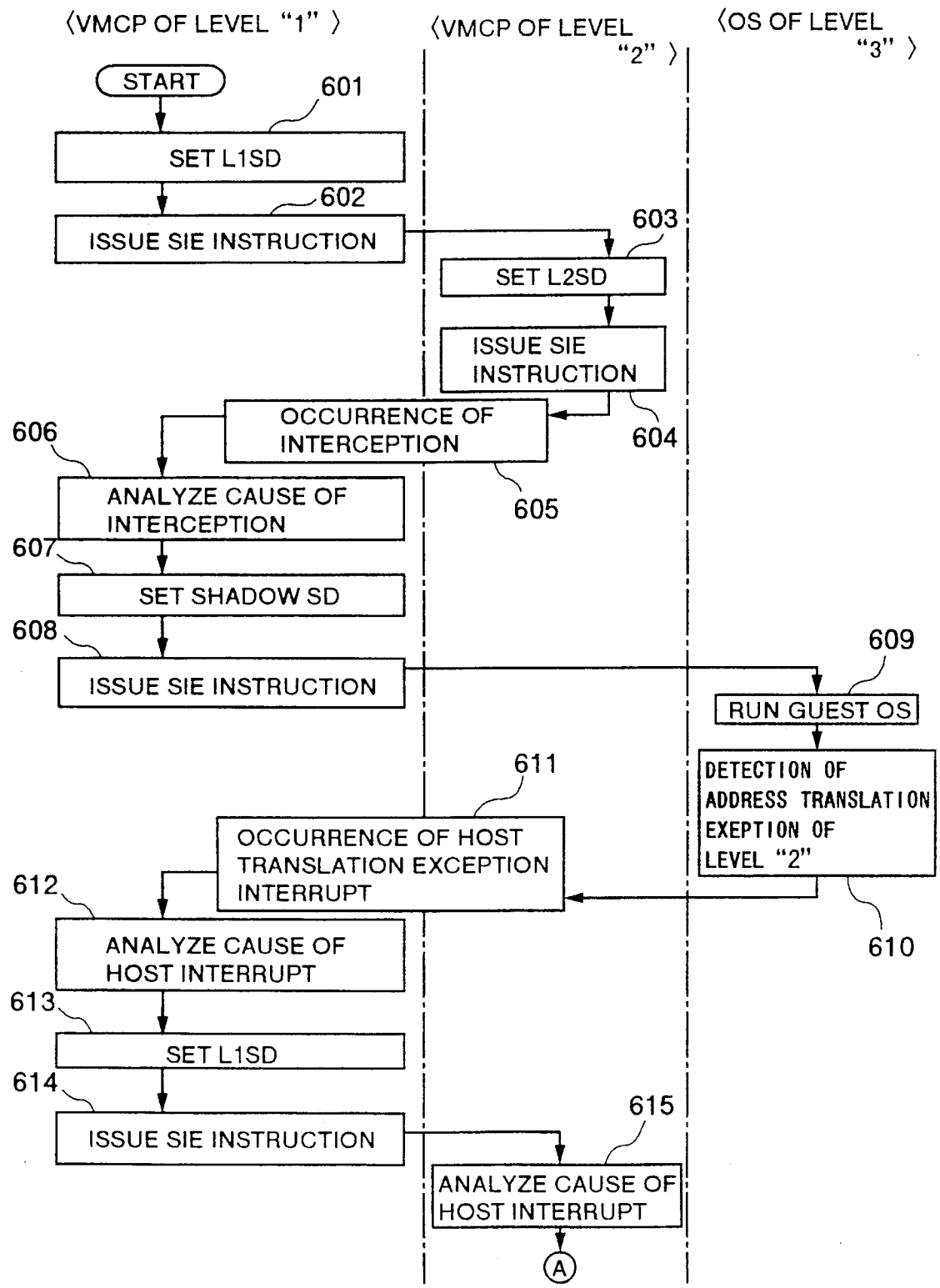
Figure 16:
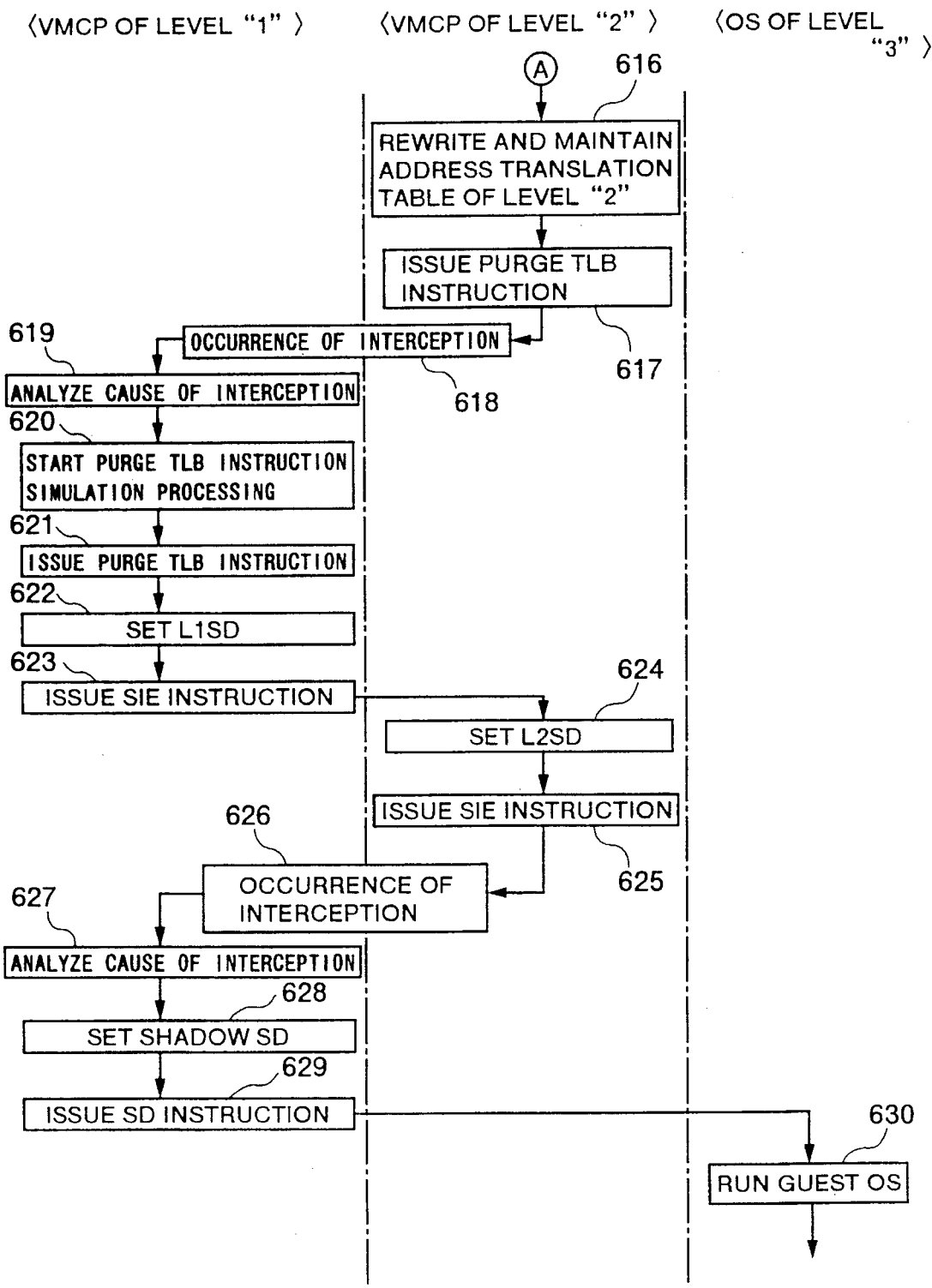
Figure 17:
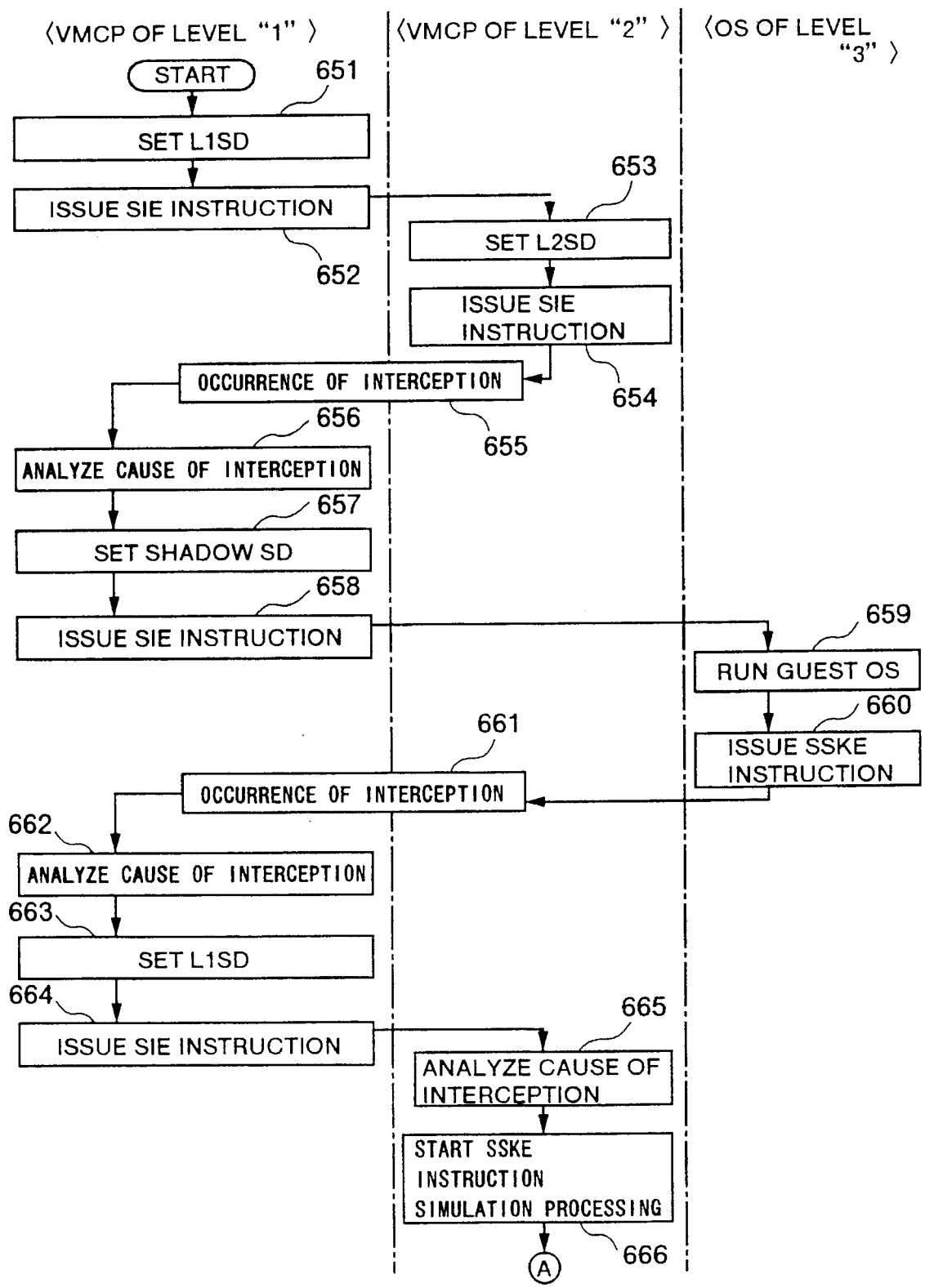
Figure 18:
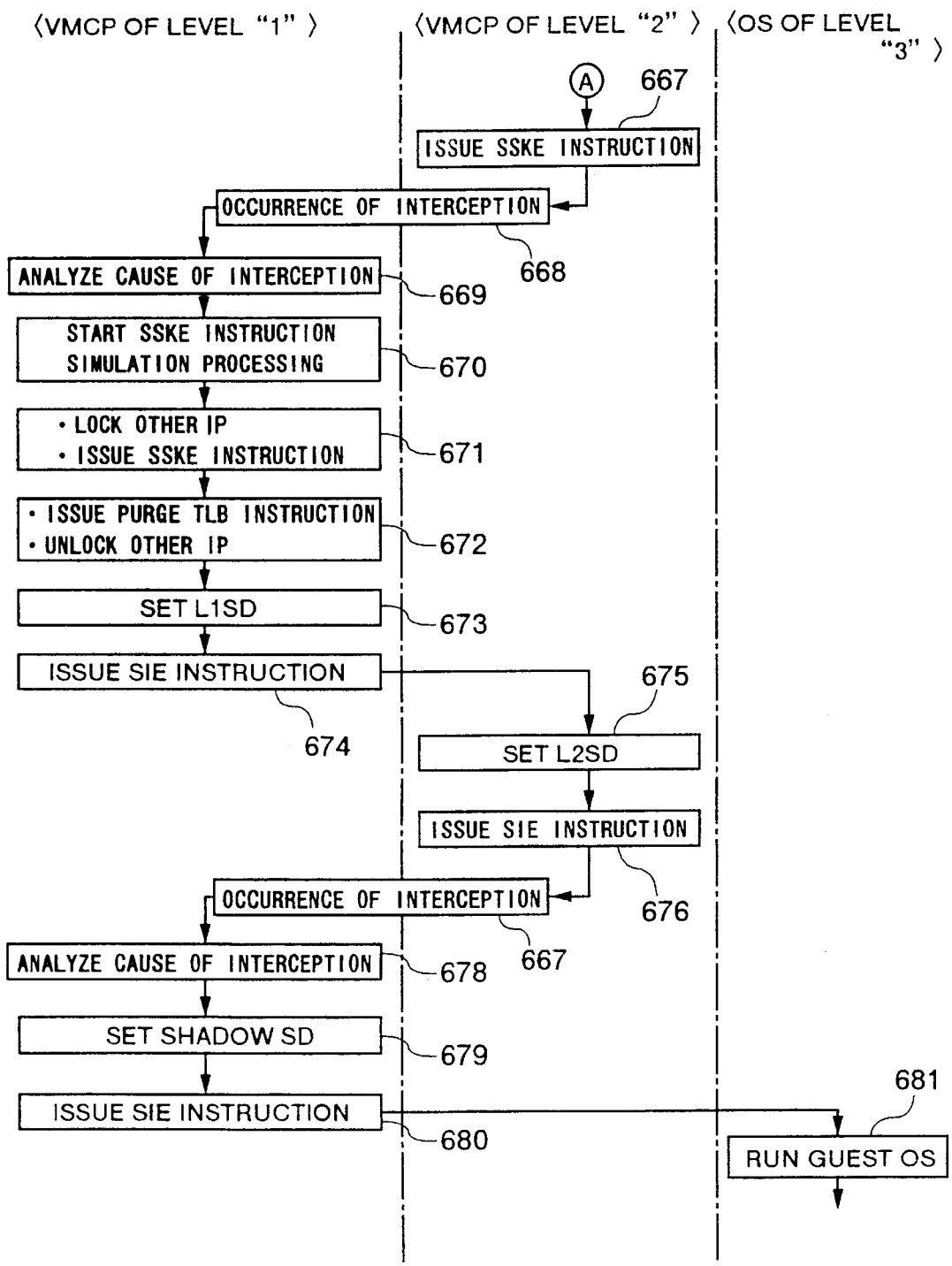

FIGS. 6A and 6B are views for illustrating examples of parameters resident in a multi-processor interface serving as an information communication facility in the system shown in FIG. 4;

FIG. 7 is a flow chart for illustrating in detail a method of purging an translation lookaside buffer in the system shown in FIG. 4 according to another embodiments of the invention;

FIG. 8 is a flow chart for illustrating in detail an translation lookaside buffer purging method in the system shown in FIG. 4 according to a further embodiment of the invention;

FIG. 9 is a flow chart to which that of FIG. 8 is to be continued;

FIG. 10 is a schematic diagram for illustrating the concept of a system in which real processors (real CPUs) are employed so as to cooperate with one another in the virtual machine system;

FIG. 11 is a schematic diagram showing conceptually a configuration of a virtual machine system in which a virtual machine control program of level "1" and a virtual machine control program of level "2", are loaded, whereon virtual machines are created;

FIG. 12 is a flow chart illustrating conceptually flows of controls of virtual machine control programs of level "1", and level "2" and a guest operating system of level "3" in the virtual machine system configured as shown in FIG. 11;

FIG. 13 is a block diagram showing an arrangement of the translation lookaside buffer and peripheral circuits known heretofore;

FIG. 14 is a diagram illustrating, by way of example, memory area allocation of a main storage in a system in which a plurality of virtual machines are hierarchically structuralized;

FIG. 15 is a flow chart illustrating a processing procedure involved in carrying out an translation lookaside buffer purging method known heretofore;

FIG. 16 is a flow chart to which that of FIG. 15 is to be continued;

FIG. 17 is a flow chart illustrating in detail processing procedures involved in carrying out an translation lookaside buffer purging method known heretofore in a virtual machine system of a multi-processor configuration; and FIG. 18 is a flow chart to which the flow chart of FIG. 17 is to be continued.

DESCRIPTION OF THE PREFERRED EMBODIMENTS

The translation lookaside buffer purging method in a virtual machine system according to the present invention will now be described in detail in conjunction with the preferred or exemplary embodiments by reference to the accompanying drawings.

EMBODIMENT 1

Figure 1:
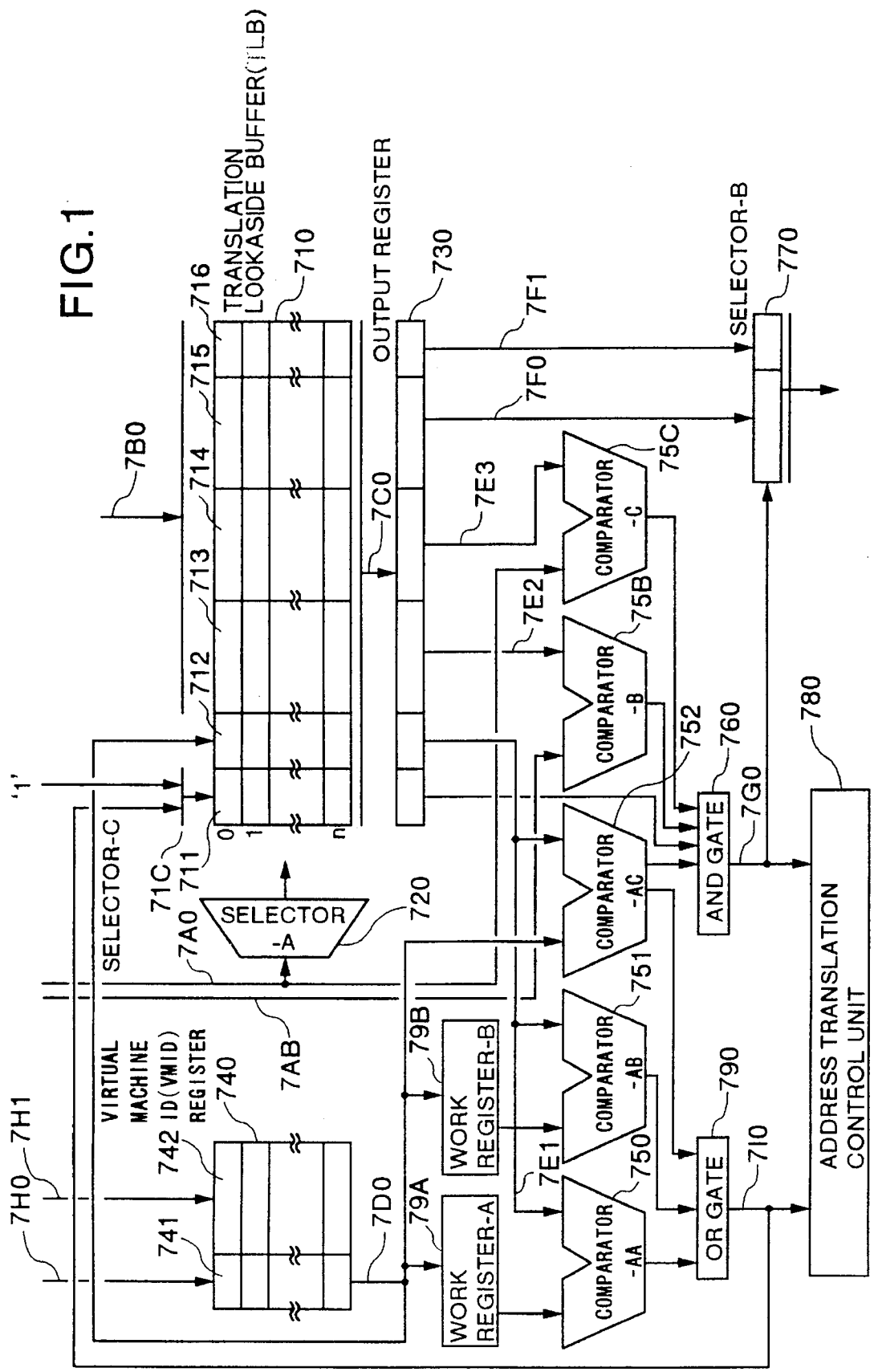
FIG. 1 is a block diagram showing an arrangement of the translation lookaside buffer and peripheral circuits to which the present invention is applied.

FIG. 1 is a block diagram showing an arrangement of a translation lookaside buffer containing virtual machine ID (identification) entries and associated peripheral circuits in a virtual machine system for carrying out an translation lookaside buffer purging method according to a first embodiment of the present invention. In this conjunction, it is assumed that the virtual machine system is structured in general in such arrangement as described hereinbefore by reference to FIG. 11.

Referring to FIG. 1, components or elements except for a comparator-AA 750, a comparator-AB 751, a comparator-AC 752, a work register-A 79A, a work register-B 79B, an OR gate 790 and a selector-C 71C are each implemented in a same structure as those described hereinbefore by reference to FIG. 13, and thus repeated description thereof will be unnecessary.

Upon partial purging of an translation lookaside buffer 710, the comparator-AA 750, the comparator-AB 751 and the comparator-AC 752 operate to compare the contents of the work register-A 79A, the work register-B 79B and a virtual machine ID entry 741, respectively, with the content of virtual machine ID entry 712 held temporarily by the output register 730.

An OR gate 790 is provided for logically ORing (i.e., determining a logical sum) of the outputs of the comparator-AA 750, the comparator-AB 751 and the comparator-AC 752.

Next, description will be made of operation for purging the translation lookaside buffer 710 in the system arrangement described above.

Referring to FIG. 1, when a TLB purge request is issued by a real CPU 202, the ID number of the TLB entry to be purged is inputted to a selector-A 720 and a comparator-C 75C via a signal line 7A0.

Upon reception of the TLB entry ID number, the selector-A 720 selects from a plurality of entry sets contained in the translation lookaside buffer 710 one entry set corresponding to the TLB entry ID number, to thereby issue a read request.

In response to the entry read request as received, the translation lookaside buffer 710 reads out the content of one relevant entry set for loading it in the output register 730 via a signal line 7C0.

On the other hand, at the time point when the TLB purge request is issued, the virtual machine ID register 740 checks the absolute address of the state description (SD) sent thereto via a signal line 7H1 to thereby select the virtual machine ID entry 741 corresponding to the state description address entry 742 holding the absolute address of the same state description. The content of the virtual machine ID entry 741 as selected is set at the work register-A 79A. The selection as well as the setting operation mentioned above are carried out primarily in accordance with a microprogram.

Through a similar procedure, the content of the virtual machine ID entry 741 which corresponds to the state description (SD) address entry 742 is set in the work register-B 79B in dependence on the absolute address of another state (SD) description supplied via the signal line 7H1. Besides, the content of the virtual machine ID entry 741 which corresponds to the state description address entry 742 is sent out onto a signal line 7D0 in accordance with the absolute address of yet another state description supplied via the signal line 7H1.

At the time point when the three virtual machine ID codes mentioned above are made available, the contents of the work register-A 79A and the work register-B 79B as well as that of the signal line 7D0 are inputted to the comparator-AA 750, the comparator-AB 751 and the comparator-AC 752, respectively, to be subsequently compared with the content of the virtual machine ID entry 712 held temporarily in the output register 730, the results of the comparison being then inputted to the OR gate 790. In dependence on the output of the OR gate 790, decision is made as to whether or not the purging of the TLB entry of concern is necessary.

A signal indicating coincidence or discrepancy resulting the comparison is sent to the translation lookaside buffer 710 and an address translation control unit 780, wherein when the signal mentioned above is logic "1" (indicating the coincidence), logic "0" is written in the entry validity flag (V-flag) 711 belonging to the selected TLB entry of the translation lookaside buffer 710, to thereby invalidate the TLB entry of concern. However, when the above signal is logic "0" (indicating the discrepancy), the invalidation of the TLB entry is inhibited.

Next, assuming that areas of a main storage 201 is allocated to a virtual machine control program 211 of level "1", a virtual machine control program 231 of level "2" and a guest operating system-A 251 of level "3" in a manner as illustrated in FIG. 14, operations involved in the purging of the translation lookaside buffer 710 as required will be described by reference to flow charts of FIGS. 2 and 3.

Figure 2:
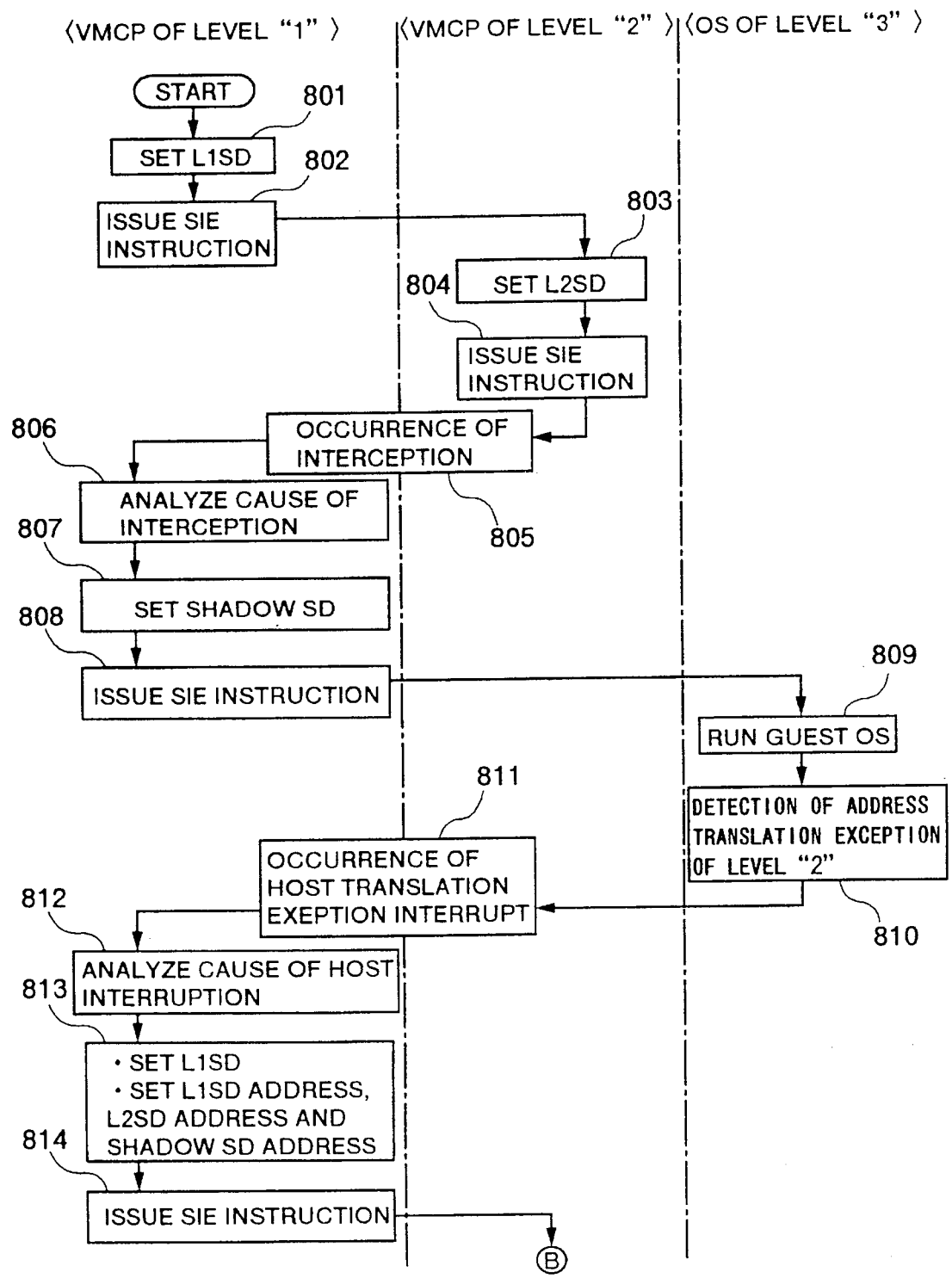
FIG. 2 is a flow chart for illustrating in detail a method for purging the translation lookaside buffer according to a first exemplary embodiment of the invention.
Figure 3:
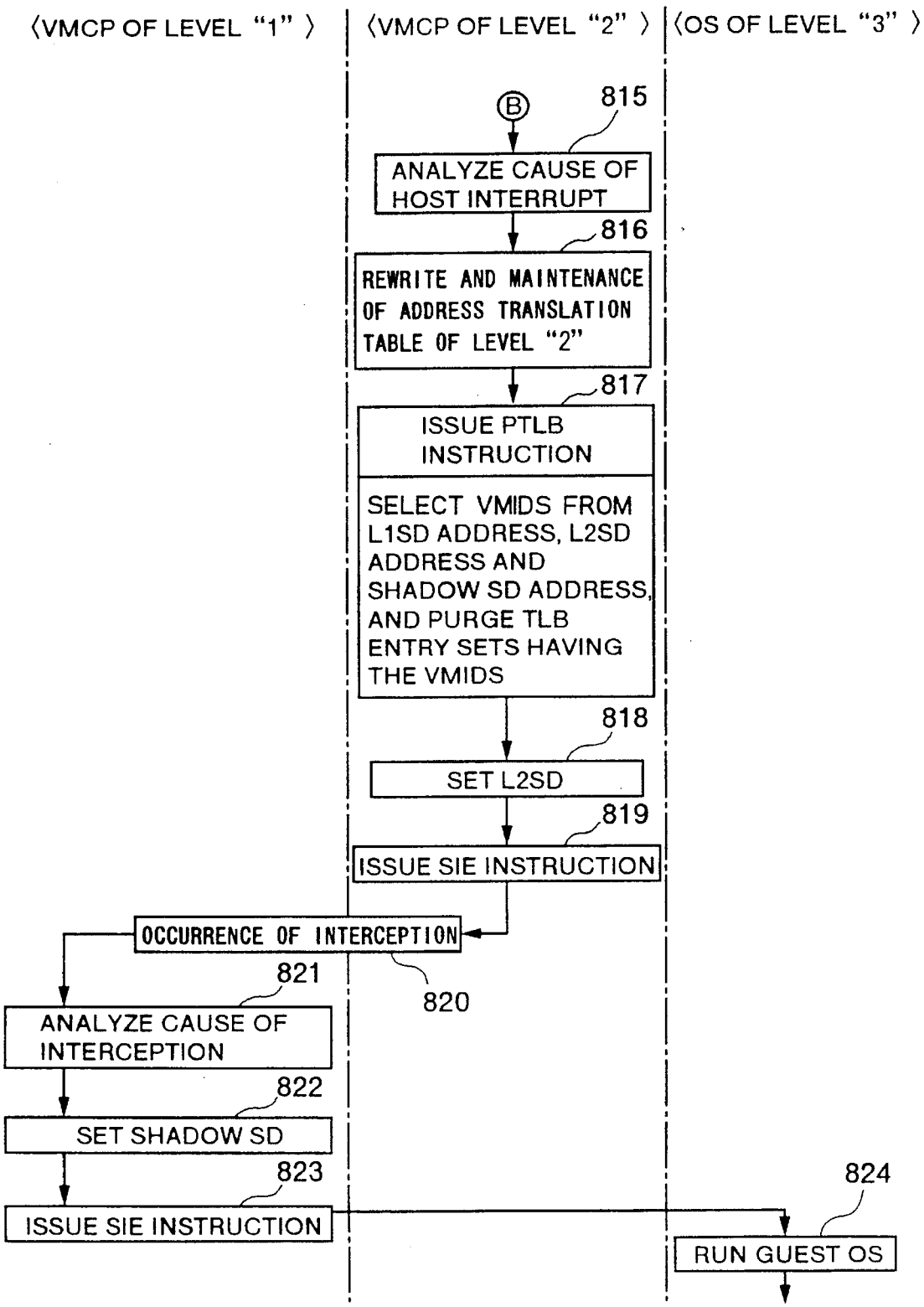
FIG. 3 is a flow chart to which the flow chart of FIG. 2 is to be continued.

FIGS. 2 and 3 illustrate flows of controls performed by the virtual machine control program (VMCP) 211 of level "1", the virtual machine control program (VMCP) 231 of level "2" and the guest operating system-A 251 of level "3" in the operation of the virtual machine system structured in such a configuration as illustrated in FIG. 11. In FIGS. 2 and 3, processing steps 801 to 812 are substantially same as the steps 601 to 612 shown in FIG. 15. Accordingly, repeated description of the steps 801 to 812 will be unnecessary.

In a step 813, in order to inform the virtual machine control program 231 of level "2" of the address translation exception, the virtual machine control program 211 of level "1" synthesizes or combines the state description of level "1" prepared for activating or starting the virtual machine control program 231 of level "2" and the shadow state description prepared for starting the guest operating system-A 251 of level to thereby set the state description of level destined for starting the virtual machine control program 231 of level "2".

Since the address translation exception mentioned above is the address translation exception of level "2" detected in the course of operation of the guest operating system-A 251 of level "3", the addresses of the state description of level "1", state description of level "2" and the shadow state description, respectively, are stored as parameters in the state description of level "1" upon setting thereof, to thereby make preparation for execution of the purge TLB instruction issued by the virtual machine control program 231 of level "2".

In a step 814, the virtual machine control program 211 of level "1" issues the start interpretive execution (SIE) instruction having state description (SD) of level "1" set as the operand in the step 813 to thereby start the running of the virtual machine control program 231 of level "2" on the virtual machine realized by the virtual machine control program (VMCP) 211 of level "1". At this time point, there has previously been stored in the prefixed save area of the virtual machine control program 231 of level "2" the interruption parameters for the address translation exception by the virtual machine control program (VMCP) 211 of level "1", while in the instruction address field of the state description of level "1" (L1SD), the instruction address part of the interrupt program status word (PSW) held in the prefixed save area of the virtual machine control program (VMCP) 231 of level "2" is stored.

In other words, the virtual machine control program 211 of level "1" simulates the address translation exception interruption to the virtual machine control program 231 of level "2". From this time point, the control is transferred to the virtual machine control program 231 of level "2" from the virtual machine control program 211 of level "1".

In a step 815, the virtual machine control program 231 of level "2" analyzes the interruption code messaged from the virtual machine control program 211 of level "1" to thereby perform the interrupt processing on a code-by-code basis. In this case, the interruption code indicates the address translation exception interruption.

In a step 816, for various interruption codes, corresponding processings are performed separately. By way of example, when the interruption code indicates address translation exception interruption, maintenance processing of the address translation table is performed.

In the case of the embodiment now under consideration, maintenance processing for the address translation lookaside table is performed because the address translation exception interruption has taken place.

In a step 817, the maintenance processing for the address translation lookaside table is executed on the virtual machine control program 231 of level "2". As a part of the maintenance processing of the address translation table, the purge TLB instruction is issued.

In this case, with the purge TLB instruction, there is set by a specific flag the state which permits the straightforward execution. Thus, the instruction interception to the virtual machine control program 211 of level "1" does not take place.

Further, as a part of the purge TLB instruction being executed, virtual machine ID entries corresponding to the address of the state description of level "1" (L1SD), state description of level "2" (L1SD) and the shadow state description, respectively, which are stored as parameters in the state description (SD) of level "1" as mentioned previously, are selected, and the contents of the entries are set in the work registers 79A and 79B with the remaining being sent out onto the signal line 7D0.

At the time point when these three virtual machine IDs are made available, the contents of the work register-A 79A and the work register-B 79B as well as the content on the signal line 7D0 are inputted to the comparator-AA 750, the comparator-AB 751 and the comparator-AC 752, respectively, to undergo simultaneous comparison with the content of the virtual machine ID entry 712 held temporarily by the output register 730. The result of the comparison is outputted onto the signal line 710 via the OR gate 790 to be utilized for determining whether or not the TLB entry to be is purged.

When the comparison results in coincidence, the TLB entry as selected is invalidated. On the other hand, in case the comparison results in discrepancy, the TLB entry is not invalidated.

The processing or operation described above is repeated a number of times which corresponds to the number of TLB entries, whereby portions of the translation lookaside buffer 710 corresponding to the three virtual machine IDs are purged (i.e., partial purging of the translation lookaside buffer 710 is performed).

At this juncture, it is to be noted that when it is not necessary to purge the TLB entry used by the virtual machine control program 211 of level "1", it is sufficient to set only the address of the state description of level "2" together with that of the shadow state description.

In steps 818 to 824, processings similar to those described hereinbefore in conjunction with the steps 624 to 630 shown in FIG. 16 are executed.

Although it has been described that three work registers are provided for storing the virtual machine identification codes of the entries purged simultaneously in parallel, it goes without saying that more or less number work registers may be used.

EMBODIMENT 2

Next, description will be directed to an TLB purging method in a virtual machine system of a multi-processor configuration according to another embodiment of the invention.

FIG. 4 is a view showing conceptionally a system configuration for carrying out the TLB purging method in a multi-processor virtual machine system together with division of a shared main storage.

Although it is assumed that the system shown in FIG. 4 includes three central processing units or CPUs, it should be understood that the invention can equally be applied to the system in which more or less number of CPUs are incorporated. Referring to FIG. 4, a shared main storage 7010 are connected to a CPU-A 7020, a CPU-B 7030 and a CPU-C 7040 via signal lines 7500, 7510 and 7520, respectively. Further, the CPU-A 7020, the CPU-B 7030 and the CPU-C 7040 are interconnected via a signal line 7600. The CPU-A 7020, the CPU-B 7030 and the CPU-C 7040 are so arranged as to be capable of making access to given areas of the shared main storage 7010 independent of one another via signal lines 7500, 7510 and 7520, respectively.

Besides, the CPU-A 7020, the CPU-B 7030 and the CPU-C 7040 can transfer information or data with one another via a signal line 7600.

The information transferred among the CPUs via the signal line 7600 includes, for example, a purge TLB processing start request, waiting state clear command request and/or request accept acknowledge information.

On the other hand, the shared main storage 7010 is divided into a software use area (SUA in abbreviation) to be used by conventional software and a hardware system area (HSA in abbreviation) intrinsically assigned to the use of hardware.

Both the software use area and the hardware system area can be accessed by all the CPUs incorporated in the multi-processors via signal line 7500, 7510 or 7520.

More specifically, by using a given region in the hardware system area as a communication buffer for inter-CPU communication, transactions or transfers of various information can be realized among all the CPUs constituting the multi-processor system.

Structuralization of the hardware system area will be described below in the case where an inter-CPU communication area (CCA in abbreviation) is provided in the hardware system area of the shared main storage 7010.

In the case of the instant embodiment of the invention, the inter-CPU communication area is comprised of a system-command area (SCA in abbreviation) 7110, a use area 7120 for the CPU-A, a use area 7130 for the CPU-B and a use area 7140 for the CPU-C.

The system-common area 7110 is used for storing information destined to be used in common by all of the CPU-A 7020, the CPU-B 7030 and the CPU-C 7040. The information stored in the system-common area 7110 includes, for example, measurement block keys for measuring input/output channel functions, measurement block update mode bit, measurement block origin address, lock information for allowing each of the CPUs to use exclusively the system-common area 7110 and other.

The use area 7120 of the CPU-A is destined for storing information to be inherently used by the CPU-A 7020 as well as information to be sent out to the other CPUs such as the CPU-B 7030 and the CPU-C 7040. In the case of the instant embodiment, this area is used for transferring information to the CPU-B 7030 and the CPU-C 7040 via a multi-processor (MP) interface.

The use area 7130 of the CPU-B and the use area 7140 of the CPU-C are inherently used by the other CPUs than the CPU-A 7020. Namely, these areas are used by the CPU-B 7030 and the CPU-C 7040, respectively, and serve for the same role as the use area 7120 of the CPU-A 7020.

In the following, the normal information transfer among the CPU-A 7020, the CPU-B 7030 and the CPU-C 7040 in the system shown in FIG. 4 will be described in detail by reference to FIG. 5.

FIG. 5 is a flow chart illustrating a processing procedure for the inter-CPU information transfer or transaction.

In a step 501, when the CPU-A 7020 requests some operation of the CPU-B 7030 and the CPU-C 7040, the CPU-A 7020 stores multi-processor interface parameters prescribing the content of the operation under request in the use area 7120 of the CPU-A within the hardware system area of the shared main storage 7010 via the signal line 7500. In this case, the load operation to this end is effectuated with the aid of a means similar to the conventional one employed for accessing the main storage for storing data.

Subsequently, in a step 502, the CPU-A 7020 sends out the operation request signal to the CPU-B 7030 and the CPU-C 7040 via a signal line 760 and waits for a message signal indicating completion of the requested operation from the CPU-B 7030 and the CPU-C 7040 via a signal line 7600.

In a step 503, the CPU-A 7020 is set to the waiting state after sending the operation request signal to the CPU-B 7030 and the CPU-C 7040 until the message signal indicating completion of the requested operation is sent back from the CPU-B 7030 and the CPU-C 7040 via the signal line 7600.

In steps 511 to 521, upon reception of the operation request signal supplied via the signal line 7600, the CPU-B 7030 and the CPU-C 7040 interrupt or suspend temporarily the routine processings being currently executed to thereby start the multi-processor (MP) interface communication (this operation will hereinafter be referred to as the 'brake-in').

In steps 512 and 522, upon intervention of the break-in, the CPU-B 7030 and the CPU-C 7040 suspend temporarily the processings currently executed to thereby start the multi-processor (MP) interface communication operation.

In steps 513 and 523, the CPU-B 7030 and the CPU-C 7040 fetch the multi-processor interface parameter prescribing the content of the operation requested by the CPU-A 7020 and stored by the latter from the use area 7120 of the CPU-A 7020 secured in the hardware system area of the shared main storage 7010 via the signal lines 7510 and 7520, respectively.

In this case, the fetch operation can be realized with the aid of a conventional access means used for fetching data from the main storage.

In steps 514 and 524, the CPU-B 7030 and the CPU-C 7040 determine the operation requested by the CPU-A 7020 on the basis of the operation request information received via the signal line 7600 and the multi-processor interface parameters fetched from the use area 7120 of the CPU-A secured in the hardware system area of the shared main storage 7010 and execute the operation as determined.

In steps 515 and 525, when execution of the operation requested or designated by the CPU-A 7020 has been completed, the CPU-B 7030 and the CPU-C 7040 send an operation end signal to the CPU-A 7020 via the signal line 7600.

In steps 516 and 526, the CPU-B 7030 and the CPU-C 7040 are set to the waiting state in succession to the sending-out of the operation end signal to the CPU-A 7020 via the signal line 7600 until a signal commanding execution of the processings temporarily suspended is received via the signal line 7600.

In a step 504, the CPU-A 7020 set to the waiting state in the step 503 monitors the send-back of the operation end signal from both the CPU-B 7030 and the CPU-C 7040 via the signal line 7600. Upon detection of the operation end signal sent from both the CPU-B 7030 and the CPU-C 7040 via the signal line 7600, the processing proceeds to a step 505.

In the step 505, the CPU-A 7020 responds to the operation end signal sent from both the CPU-B 7030 and the CPU-C 7040 to thereby complete the operations in the steps 503 and 504 and send a normal or routine processing continuation command signal to the CPU-B 7030 and the CPU-C 7040 via the signal line 7600. Subsequently, the CPU-A 7020 restarts the routine processing thereof.

In steps 519 and 521, the CPU-B 7030 and the CPU-C 7040 receive the routine processing continuation command signal from the CPU-A 7020 via the signal line 7600 to terminate the waiting state prevailing currently in the steps 516 and 526 to thereby restart the routine processing.

Now, description will be made of the parameters transferred among the CPU-A 7020, the CPU-B 7030 and the CPU-C 7040.

FIG. 6 is a view for illustrating parameter information transferred between or among the CPUs.

When the CPU-A 7020 requests some operation to be executed by the CPU-B 7030 and the CPU-C 7040, the former first stores multi-processor interface parameters prescribing the content of the operation of concern in the use area 7120 of CPU-A 7020 secured in the hardware system area of the shared main storage 7010 via the signal line 7500. In this case, the parameters stored in the use area 7120 of CPU-A by the CPU-A 7020 include a request command prescribing the operation to be executed by the other CPUs, an entry indicating the number of purge request parameters and one or more purge request parameter sets, as is illustrated in FIG. 6A.

FIG. 6B shows in detail the content of the purge request parameter entry of FIG. 6A.

As can be seen from FIG. 6B, the purge request parameter entry 602 is comprised of a virtual machine number field 604 indicating the number of the virtual machine currently running on the request source CPU, a virtual machine ID field 605 indicating the virtual machine ID or VMID of the virtual machine running on the request source CPU, a physical instruction processor number field 606 indicating a request source real CPU number, a logical instruction processor number field 607 indicating the request source logical CPU, an absolute address field 608 indicating the absolute address of the main storage to be subject to the purge, a level "1" state description (L1SD) address field 609 indicating the address of the state description of level "1" which constitutes the operand of the start interpretive execution (SIE) instruction designated for starting the virtual machine control program 231 of level "2" by the virtual machine control program (VMCP) 211 of level "1", a level "2" state description (L2SD) address field 610 indicating the address of the state description of level "2" which constitutes an operand of the start interpretive execution instruction designated for starting the operating system 251 of level "3" by the virtual machine control program 231 of level "2", a shadow state description address field 611 indicating the address of the shadow state description which constitutes an operand of the start interpretive execution instruction designated for starting the operating system 251 of level "3" by the virtual machine control program 211 of level "1" and a field 612 for starting other parameters.

The store operation performed by the CPU-A 7020 for the use area 7120 of the CPU-A and the read operation of the CPU-B 7030 and the CPU-C 7040 from the use area 7120 of the CPU-A may be effectuated with the aid of conventional means employed in making access to the main storage.

Next, operations involved in the steps 513 to and 523 to 525 shown in FIG. 5 will be elucidated in detail by reference to FIG. 7.

FIG. 7 shows a flow chart for illustrating in further detail the processing procedures which are involved in executing the steps 513 to 515 and 523 to shown in FIG. 5.

In a step 1001, the CPU-B 7030 and the CPU-C fetch the MP interface parameters stored previously by the CPU-A 7020 and prescribing the contents of the operation requested by he CPU-A from the use area 7120 of the CPU-A secured in the hardware system area of the shared main storage 7010 via the signal lines 7510 and 7520, respectively. This fetching operation is performed with the aid of the means similar to that conventionally resorted to in accessing the main storage.

In a step 1002, the CPU-B 7030 and the CPU-C analyze the request command contained in the aforementioned MP interface parameters as fetched.

In a step 1003, the CPU-B 7030 and the CPU-C make decision as to what operation the CPU-A 7020 requires on the basis of the operation request supplied via the signal line 7600 and the multi-processor interface parameter fetched from the use area 7120 of the CPU-A and prescribing the content of the request operation.

In the case of the example now under consideration, each of the CPU-B 7030 and the CPU-C 7040 decides whether or not the request designated by the multi-processor interface parameters is a TLB partial purge request. If so, the processing proceeds to a step 1004, and, if otherwise, to a step 1005.

The processing succeeding to the step 1004 inclusive thereof is the TLB partial purge processing process taught by the invention incarnated in the instant embodiment. In the step 1004, the CPU-B 7030 and the CPU-C 7040 fetch the purge request parameter entry 602 indicating the number of the purge request parameters contained in the PM interface parameters prescribing the content of the request operation fetched from the use area 7120 of the CPU-A and load the purge request parameter entry 602 in the requested purge count (RPC) registers incorporated in the CPU-B 7030 and the CPU-C 7040, respectively.

Further, an n-register incorporated in each of the CPU-B 7030 and the CPU-C 7040 for controlling the number of the purge request parameter entries to be processed is initialized to "0" (zero). Subsequently, the processing proceeds to a step 1006.

In a step 1005, processings except for the TLB partial purge processing according to the invention are executed.

In the step 1005, the processings are performed in accordance with request commands prescribing the operations requested by the other CPU(s). Then, the processing proceeds to a step 1015.

In a step 1006, the CPU-B 7030 and the CPU-C 7040 check whether or not the contents of the requested purge count (RPC) registers incorporated in these CPUs are "0". If so (YES), the processing proceeds to the step 1015 and, if otherwise (NO), to a step 1007.

In a step 1007, the CPU-B 7030 and the CPU-C 7040 increment the content of the n-register incorporated in these CPUs. With the content of the n-register, the number of the purge request parameter entries to be handled is controlled. Thereafter, the purge request parameter entry n indicated by the content of the n-register is taken out from the use area 7120 of the CPU-A secured within the hardware system area of the shared main storage 7010.

In a step 1008, the CPU-B 7030 and the CPU-C 7040 search for the state description address entry (denoted by 442 in FIG. 13) of a virtual machine ID register (440 in FIG. 13) which is same as the address of the state description of level "1" by using the address of the state description of level "1" contained in the purge request parameter entry n taken out from the use area 7120 of the CPU-A in the step 1007. When the state description address entry as searched is found, the content of the corresponding virtual machine ID entry (442 in FIG. 13) is selected as the virtual machine ID of concern.

In a step 1009, the CPU-B 7030 and the CPU-C 7040 perform the TLB partial purge processing by using the virtual machine ID selected in the step 1008. As a result of execution of this step 1009, the TLB entry having the absolute address belonging to the virtual machine control program 211 of level "1" indicated in the absolute address field of the purge request parameter entry n is purged.

In a step 1010, the CPU-B 7030 and the CPU-C 7040 search for the state description address entry (denoted by 442 in FIG. 13) of a virtual machine ID register (440 in FIG. 13) which is same as the address of the state description of level "1" by using the address of the state description of level "1" contained in the purge request parameter entry n taken out from the use area 7120 of the CPU-A secured within the hardware system area of the shared main storage 7010, as in the case of the step 1008. When the state description address entry as searched for is found, the content of the corresponding virtual machine ID entry (442 in FIG. 13) is selected as the virtual machine ID of concern.

In a step 1011, the CPU-B 7030 and the CPU-C 7040 perform the TLB partial purge processing by using the virtual machine ID selected in the step 1010. As a result of execution of this step 1011, the TLB entry having the absolute address belonging to the virtual machine control program 231 of level "2" indicated in the absolute address field of the purge request parameter entry n is purged.

In a step 1012, the CPU-B 7030 and the CPU-C 7040 search for the state description address entry (denoted by 440 in FIG. 13) of a virtual machine ID register (440 in FIG. 13) which is same as the address of the shadow state description by using the address of the shadow state description contained in the purge request parameter entry +e,fra n+ee taken out from the use area 7120 of the CPU-A secured within the hardware system area of the shared main storage 7010, as in the case of the step 1008. When the state description address entry as searched is found, the content of the corresponding virtual machine ID entry (441 in FIG. 13) is selected as the virtual machine ID of concern.

In a step 1013, the CPU-B 7030 and the CPU-C 7040 perform the TLB partial purge processing by using the virtual machine ID selected in the step 1012. As a result of execution of this step 1013, the TLB entry having the absolute address belonging to the guest operating system 251 of level "3" indicated in the absolute address field of the purge request parameter entry n is purged.

In a step 1014, the CPU-B 7030 and the CPU-C 7040 decrement the respective requested purge count (RPC) registers storing the number of the purge request parameters. Thereafter, the step 1005 is resumed, whereon the TLB partial purge processing is repeated.

In a step 1015, upon completion of operation designated by the CPU-A 7020, the CPU-B 7030 and the CPU-C 7040 send the operation end signal to the CPU-A 7020 via the signal line 7600.

FIGS. 8 and 9 show flow charts for illustrating flows of controls performed by the virtual machine control program 211 of level "1", the virtual machine control program 231 of level "2" and the guest operating system 251 of level "3" in the virtual machine system of multi-processor configuration implemented as shown in FIG. 11. In these figures, processing steps 1101 to 1110 are substantially same as the steps 651 to 661 described hereinbefore in conjunction with FIG. 17. Accordingly, repeated description of these steps will be unnecessary.

Referring to the flow charts mentioned above, in a step 1112, the virtual machine control program 211 of level "1" synthesizes or combines the state description of level "1" prepared for starting the virtual machine control program 231 of level "2" and the shadow state description prepared for starting the guest operating system 251 of level "3" to thereby set the state description of level "1" for starting the virtual machine control program 231 of level "2" in order to inform the virtual machine control program 231 of level "2" of the instruction interception. Since this instruction interception makes appearance upon execution of the SSKE (Set Storage Key Extended) instruction by the guest operating system 231 of level "3", the address of the state description (SD) of level "1", address of the state description of level "2" and the address of the shadow state description are stored in the state description of level "1" upon setting thereof, to thereby set to "1" the flag for direct execution of the SSKE instruction of level "2" in order to suppress the interception originating in the SSKE instruction which will be issued by the virtual machine control program 231 of level "2".

In a step 1113, the virtual machine control program 211 of level "1" issues the start interpretive execution (SIE) instruction with the state description of level "1" set in the step 1112 as an operand to thereby allow the virtual machine control program 231 of level "2" to run on the VM of virtual machine control program 211 of level "1". In that case, a parameter indicating occurrence of the instruction interception and the parameters generated in the step 112 are stored in the state description of level "1" (L1SD). Further stored in the instruction address field of the state description of level "1" is the address of an instruction which succeeds to the start interpretive execution (SIE) instruction issued by the virtual machine control program 231 of level "2".

From this time point, the control is transferred to the virtual machine control program 231 of level "2" from the virtual machine control program 211 of level "1".

The virtual machine control program 231 of level "2" analyzes the interruption code supplied from the virtual machine control program 211 of level "1" to thereby perform the interception processing on a code-by-code basis. In this case, since the interruption code indicates the instruction interception, simulation of the relevant instruction is performed.

Since the instruction interception takes place upon execution of the SSKE instruction, simulation of the SSKE instruction is performed.

In a step 1115, the simulation processing for the SSKE instruction is executed by the virtual machine control program 231 of level "2". As a part of the SSKE instruction simulating processing, a SSKE instruction is issued.

The SSKE instruction issued in the course of the SSKE instruction simulation processing has a factor for instruction interception. However of the flag of level "2" indicating direct execution, the SSKE instruction and contained in the state description of level "1" is set to logic "1" as mentioned previously, the interception is suppressed. Thus, the control is not transferred back to the virtual machine control program 211 of level "1" from the virtual machine control program 231 of level "2" but continued by hardware, as it is.

In the procedure for directly executing the SSKE instruction, a series of processing steps 1004 to 1014 described hereinbefore by reference to FIG. 7 is executed by the CPU which issued the SSKE instruction, while the other CPU which received the TLB partial purge request executes a series of processing steps 1001 to 1015 shown in FIG. 7, wherein the TLB entry purge operation is performed in synchronism with execution of the SSKE instruction.

In steps 1116 to 1121, processings similar to those in the steps 675 to 681 are performed.

Parenthetically, it should be mentioned that by providing the work register shown in FIG. 1, it is possible to purge the entry of concern through a single process instead of repeating the steps 1006 to 1014 shown in FIG. 7.

We claim:

1. In a virtual machine system, comprising a first central processing unit provided with a plurality of levels of virtual machines, a main storage shared by said virtual machines, and a translation lookaside buffer having a plurality of entries for storing a plurality of sets, each set including a logical address used by each of said virtual machines in accessing said main storage in the past, an absolute address corresponding to said logical address, and a virtual machine identification code, allocated to an access source virtual machine, for translating the logical address to the absolute address by referencing said entries when each of said virtual machines makes access to said main storage, wherein at least one register, provided in association with said virtual machine system, stores virtual machine identification codess, each identifying one of said virtual machines, a method of purging said translation lookaside buffer comprising the steps of:

storing, upon execution of an instruction issued by a particular one of said virtual machines and which is accompanied by a purge of said translation lookaside buffer, a virtual machine identification code of said particular virtual machine and a virtual machine identification code of another level of said virtual machines having a translation lookaside buffer entry to be purged; and when said instruction is executed, purging in parallel the entry storing the virtual machine identification code which coincides with that of said particular virtual machine and the entry storing the virtual machine identification code which coincides with that of said another level of virtual machines.

2. In the virtual machine system of claim 1, said system including a second central processing unit provided with a plurality of levels of virtual machines, first communication means for allowing information to be transferred directly between said first and second central processing units, second communication means for allowing information to be transferred between said first and second central processing units via a predetermined area of said main storage, said method further comprising the steps of:

sending, upon execution of an instruction which is issued by said particular one of said virtual machines and which is accompanied with a purge of said translation lookaside buffer, by the central processing unit having said particular virtual machine, a virtual machine identification code of the virtual machine of the other central processing unit having the translation lookaside buffer entry to be purged to said other central processing unit by way of said first and second communication means; and when said instruction is executed, purging in parallel the entry storing the virtual machine identification code coinciding with that of said particular virtual machine and the entry storing the virtual machine identification code coinciding with that of the virtual machine incorporated in said other central processing unit.

3. In a virtual machine system, comprising at least one central processing unit provided with a real machine on which a first level operating system operates, a plurality of second level virtual machines controlled by the first level operating system, a second level operating system operating on each second level virtual machine, and a plurality of third level virtual machines controlled by the second level operating system, a main storage shared by said plurality of virtual machines, and a translation lookaside buffer having a plurality of entries for storing a plurality of sets, each set including a logical address used by each of said virtual machines in accessing said main storage in the past, an absolute address corresponding to said logical address, and a virtual machine identification code, allocated to an access source virtual machine, for translating the logical address to the absolute address by referencing said entries when each of said virtual machines makes access to said main storage, wherein at least one register, provided in association with said virtual machine system, stores virtual machine identification codes, each identifying one of said virtual machines, a method of purging said translation lookaside buffer comprising the steps of:

storing, upon execution of an instruction issued by a particular one of said virtual machines and which is accompanied by a purge of said translation lookaside buffer, a virtual machine identification code of said particular virtual machine and a virtual machine identification code of another level of said virtual machines having translation lookaside buffer entry to be purged; and when said instruction is executed, purging in parallel the entry storing the virtual machine identification code which coincides with that of said particular virtual machine and the entry storing the virtual machine identification code which coincides with that of said another level of virtual machines.

* * * * *